(12) United States Patent
Mess et al.

(10) Patent No.: US 11,293,562 B2
(45) Date of Patent: Apr. 5, 2022

(54) FLOW TUBE FOR HOSTING A FLOW METER AND A SHUT-OFF VALVE

(71) Applicant: StreamLabs, Inc., Whitehouse Station, NJ (US)

(72) Inventors: Frank McCarthy Mess, Smyrna, GA (US); Jorge Carlos Almirall, Acworth, GA (US); Alexander Neal Rycroft, Atlanta, GA (US); Thimuthu Weragoda Vidanelage, Atlanta, GA (US)

(73) Assignee: StreamLabs, Inc., Whitehouse Station, NJ (US)

( * ) Notice: Subject to any disclaimer, the term of this patent is extended or adjusted under 35 U.S.C. 154(b) by 0 days.

(21) Appl. No.: 15/942,068

(22) Filed: Mar. 30, 2018

(65) Prior Publication Data

US 2019/0234528 A1 Aug. 1, 2019

Related U.S. Application Data

(63) Continuation of application No. PCT/US2018/016484, filed on Feb. 1, 2018.

(51) Int. Cl.
*F16K 37/00* (2006.01)
*F16K 27/06* (2006.01)
(Continued)

(52) U.S. Cl.
CPC .......... *F16K 37/005* (2013.01); *F16K 27/067* (2013.01); *G01F 1/662* (2013.01);
(Continued)

(58) Field of Classification Search
CPC ........ F16K 37/005; F16K 27/067; F16K 5/06; G01F 1/66; G01F 1/662; G01F 15/005; G01M 3/2807
See application file for complete search history.

(56) References Cited

U.S. PATENT DOCUMENTS 4,080,837 A * 3/1978 Alexander ................ G01F 1/66
73/597
4,236,406 A * 12/1980 Reed ....................... G01P 5/247
73/61.45
(Continued)

FOREIGN PATENT DOCUMENTS

CN 204988388 U 1/2016
EP 2 682 719 A1 1/2014
(Continued)

OTHER PUBLICATIONS

International Search Report and Written Opinion for PCT/US2018/016484, dated Aug. 10, 2018.
(Continued)

*Primary Examiner* — Patrick C Williams
(74) *Attorney, Agent, or Firm* — Fish & Richardson P.C.

(57) ABSTRACT

According to at least one aspect, a fluid flow tube can define a first cavity for receiving a first ultrasonic sensor. The first cavity can have a first longitudinal axis intersecting a longitudinal axis of the fluid flow tube. The fluid flow tube can define a second cavity for receiving a second ultrasonic sensor. The second cavity can have a second longitudinal axis aligned with the first longitudinal axis. The fluid flow tube can define a third cavity having a first transverse cross sectional area larger than a second transverse cross sectional area of the fluid flow tube and sized to receive a shut-off valve.

18 Claims, 11 Drawing Sheets

(51) Int. Cl.
  *G01F 15/00* (2006.01)
  *G01F 1/66* (2022.01)
  *G01M 3/28* (2006.01)
  *F16K 5/06* (2006.01)
(52) U.S. Cl.
  CPC .............. *G01F 15/005* (2013.01); *F16K 5/06* (2013.01); *G01F 1/66* (2013.01); *G01M 3/2807* (2013.01)

(56) References Cited

U.S. PATENT DOCUMENTS

| | | | |
|---|---|---|---|
| 4,649,754 | A | 3/1987 | Zacharias |
| 6,624,539 | B1 | 9/2003 | Hansen et al. |
| 6,796,189 | B1* | 9/2004 | Umekage ................. G01F 1/66 73/861.27 |
| 7,650,903 | B2* | 1/2010 | Yamamoto ............ F16K 31/126 137/487.5 |
| 7,876,030 | B2 | 1/2011 | Taki et al. |
| 7,980,142 | B2 | 7/2011 | Nakabayashi et al. |
| 8,181,534 | B2 | 5/2012 | Allen |
| 8,186,229 | B2 | 5/2012 | Allen |
| 9,063,069 | B2 | 6/2015 | Stickel |
| 9,175,994 | B2 | 11/2015 | Ueberschlag et al. |
| 2006/0260691 | A1* | 11/2006 | Davidoff ............. G01M 3/2807 137/487.5 |
| 2007/0035211 | A1 | 2/2007 | Straub et al. |
| 2007/0035212 | A1 | 2/2007 | Straub et al. |
| 2010/0011867 | A1 | 1/2010 | van Klooster et al. |
| 2010/0257942 | A1 | 10/2010 | Straub, Jr. et al. |
| 2010/0313676 | A1 | 12/2010 | Straub, Jr. |
| 2011/0146412 | A1 | 6/2011 | Hoering et al. |
| 2011/0162460 | A1 | 7/2011 | Allen et al. |
| 2011/0162461 | A1 | 7/2011 | Allen |
| 2011/0162462 | A1 | 7/2011 | Allen |
| 2011/0314932 | A1 | 12/2011 | Straub et al. |
| 2013/0167654 | A1 | 7/2013 | Ueberschlag et al. |
| 2013/0219707 | A1 | 8/2013 | Sui et al. |
| 2013/0220012 | A1 | 8/2013 | Knowles et al. |
| 2013/0291650 | A1* | 11/2013 | Brown .................... G01F 1/662 73/861.28 |
| 2014/0083181 | A1 | 3/2014 | McDonald et al. |
| 2014/0252254 | A1* | 9/2014 | Yuan ....................... F16K 5/204 251/188 |
| 2015/0042206 | A1 | 2/2015 | Nguyen et al. |
| 2015/0159351 | A1* | 6/2015 | Smith .................... E03C 1/025 251/129.11 |
| 2015/0308870 | A1 | 10/2015 | Gottlieb et al. |
| 2016/0093280 | A1 | 3/2016 | Ueberschlag et al. |
| 2016/0116317 | A1 | 4/2016 | Zhang et al. |
| 2016/0138951 | A1 | 5/2016 | Pretre |
| 2016/0161310 | A1 | 6/2016 | Leaders et al. |
| 2016/0335875 | A1* | 11/2016 | Alcorn ..................... G01F 1/34 |

FOREIGN PATENT DOCUMENTS

| | | |
|---|---|---|
| JP | 60-061621 | 4/1985 |
| JP | S6061621 A | 4/1985 |
| JP | H109916 A | 1/1998 |
| JP | 2002-131098 A | 5/2002 |
| JP | 2017-173200 A | 9/2017 |

OTHER PUBLICATIONS

International Search Report and Written Opinion for PCT/US2018/016486 dated Oct. 22, 2016.
Non-Final Office Action on U.S. Appl. No. 15/942,080 dated Jan. 27, 2020 (12 pages).
Written Opinion on PCT PCT/US2018/016486 dated Jan. 30, 2020.
Final Office Action on U.S. Appl. No. 15/942,080 dated May 13, 2020 (14 pages).
Foreign Action other than Search Report on PCT Appl. Ser. No. PCT/US2018/016486 dated Jun. 8, 2020 (9 pages).
Written Opinion of the International Preliminary Examining Authority for PCT/US2018/016484 dated Jan. 21, 2020 (7 pages).
U.S. Non-Final Office Action on U.S. Appl. No. 15/942,080 dated Sep. 17, 2020 (15 pages).
U.S. Notice of Allowance on U.S. Appl. No. 15/942,080 dated May 12, 2021 (11 pages).

* cited by examiner

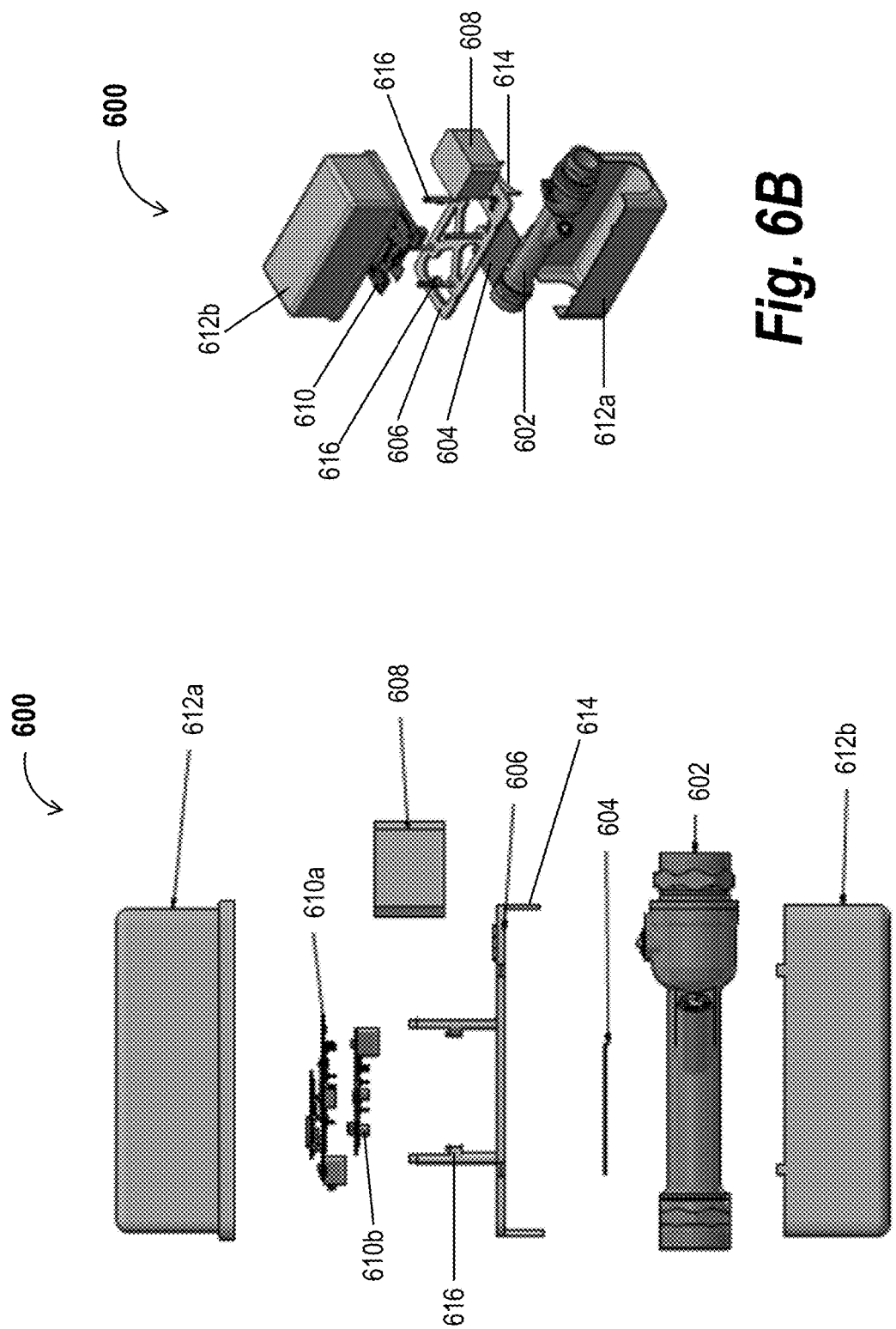

FLOW TUBE FOR HOSTING A FLOW METER AND A SHUT-OFF VALVE

RELATED APPLICATION

This application is a continuation bypass and claims priority to International Application No. PCT/US2018/016484, filed Feb. 1, 2018, entitled "FLOW TUBE FOR HOSTING A FLOW METER AND A SHUT-OFF VALVE" and filed on Feb. 1, 2018, all of which is incorporated herein by reference in its entirety.

BACKGROUND

In dwellings, residential buildings, work offices, public buildings, factories, or farms, fluid flow meters can allow for monitoring fluid flow rate or cumulative fluid usage. Also, shut-off valves can be employed to control (e.g., allow or block) fluid flow through one or more branches of a fluid distribution system. Integrating a smart fluid flow meter and a shut-off valve in a single plumbing device can allow for intelligent monitoring, management, or control of fluid flow to, or from, a given branch of the fluid distribution system. Also, electronic components such as microprocessors coupled to the fluid flow meter and the shut-off valve can allow for accurate measurements of fluid flow rate, remote or autonomous control of the shut-off valve, leak detection, communicating measurements to remote electronic devices, or a communication thereof. For example, a processor can detect a leak event by analyzing flow rate values measured by the fluid flow meter, and automatically actuating the shut-off valve to avoid fluid waste, property damages, or hazardous incidents (e.g., potential fire due natural gas leak).

SUMMARY

According to at least one aspect, a fluid flow tube can define a first cavity for receiving a first ultrasonic sensor. The first cavity can have a first longitudinal axis intersecting a longitudinal axis of the fluid flow tube. The fluid flow tube can define a second cavity for receiving a second ultrasonic sensor. The second cavity can have a second longitudinal axis aligned with the first longitudinal axis. The fluid flow tube can define a third cavity having a first transverse cross sectional area larger than a second transverse cross sectional area of the fluid flow tube and sized to receive a shut-off valve.

The fluid flow tube can be made of at least one of brass, copper, stainless steel, plastic, or an engineered composite material. The third cavity can be defined by a hollow structure to enclose the shut-off valve. The hollow structure can include an opening to receive a stem of the shut-off valve. The hollow structure can include one or more grooves for engaging one or more elements of a housing of the fluid flow tube or receiving mechanical coupling components to mechanically couple the fluid flow tube to the housing. The hollow structure can have a cylindrical shape or a spherical shape.

The fluid flow tube can include a first tubular structure defining a lumen that is connected to the first cavity, the second cavity, and the third cavity. The lumen can be associated with the second transverse cross sectional area. The first cavity can be defined by a second tubular structure extending beyond an outer surface of the first tubular structure, and the second cavity can be defined by a second tubular structure extending beyond the outer surface of the first tubular structure. The first tubular structure can include at least one borehole for hosting at least one sensor or electric couplings to the at least one sensor. The at least one borehole can include at least one of a borehole for hosting a pressure sensor or a borehole for hosting a thermocouple.

The first longitudinal axis and the second longitudinal axis can intersect the longitudinal axis of the fluid flow tube at an angle about 45 degrees. The fluid flow tube can include a thread at a respective end to engage a pipe or a fitting.

According to at least one other aspect, a plumbing device can include a fluid flow tube and a fitting engaging the fluid flow tube at a first end of the fluid flow tube. The fluid flow tube can define a first cavity having a first longitudinal axis for receiving a first ultrasonic sensor. The first longitudinal axis can intersect a longitudinal axis of the fluid flow tube. The fluid flow tube can define a second cavity for receiving a second ultrasonic sensor. The second cavity can have a second longitudinal axis aligned with the first longitudinal axis. The fluid flow tube can define a third cavity having a diameter larger than a diameter of the fluid flow tube and sized to receive a shut-off valve.

The plumbing device can include the shut-off valve. The shut-off valve can be enclosed within a hollow structure defining the third cavity. The plumbing device can include a motor to impart motion to the shut-off valve. The plumbing device can also include a stem mechanically coupling the shut-off valve to the motor. The stem can be arranged to pass through a borehole of the hollow structure. The plumbing device can include a control circuit board for actuating the motor.

The plumbing device can include a first sensor mount arranged within the first cavity and a second sensor mount arranged within the second cavity. The first sensor mount can include a first recess hosting the first ultrasonic sensor. The second sensor mount can include a second recess hosting the second ultrasonic sensor. The plumbing device can include a control circuit board for exchanging signals with the first and second ultrasonic sensors.

The plumbing device can include one or more sensors and a sensor interface board electrically coupled to the one or more sensors. The one or more sensors can be arranged within one or more boreholes of a tubular structure defining a lumen of the fluid flow tube. The one or more sensors can include at least one of a pressure sensor or a thermocouple arranged. The plumbing device can include a housing enclosing the fluid flow tube. The fitting can include a push-to-connect fitting or a fitting engaging the fluid flow tube through a thread.

According to at least one other aspect, a monolithic sensor mount can include a first cylindrical portion and a second cylindrical portion. The first cylindrical portion can have a first diameter and the second cylindrical portion can have a second diameter larger than the first diameter. The second cylindrical portion defining a recess region to host an ultrasonic transducer. The second cylindrical portion can have an outer surface that defines a male thread to mechanically engage a female thread of a cavity within a fluid flow tube configured to host the sensor mount.

A wall structure surrounding the recess region can include groves to mechanically engage a screw driver. A depth of the grooves can be smaller than a difference between a depth of the recess region and a thickness of the ultrasonic transducer. The recess region can form a hexagonal socket sized to match an Allen key. The monolithic sensor mount can be made of plastic. The monolithic sensor mount can be made of made of polyvinylchloride (PVC) or polysulfone (PSU).

The first diameter can be smaller than a diameter of the cavity within the fluid flow tube configured to host the sensor mount. A length of the first cylindrical portion can be larger than a depth of the cavity within the fluid flow tube configured to host the sensor mount. An end-face surface of the first cylindrical portion can be a flat circular area. The end-face surface of the first cylindrical portion can have a concave structure.

The first cylindrical portion can include a first sub-portion and a second sub-portion. The second sub-portion can have a diameter smaller than a diameter of the first sub-portion. The first sub-portion can be arranged between the second sub-portion and the second cylindrical portion.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The accompanying drawings, which are incorporated in and constitute a part of this specification, illustrate embodiments of the disclosed technology and together with the description serve to explain principles of the disclosed technology.

FIGS. 6A-6C show diagrams illustrating probability distributions for average water flow rates associated with a plurality of fixtures or appliances in a house or building.

DETAILED DESCRIPTION

Figure 1:
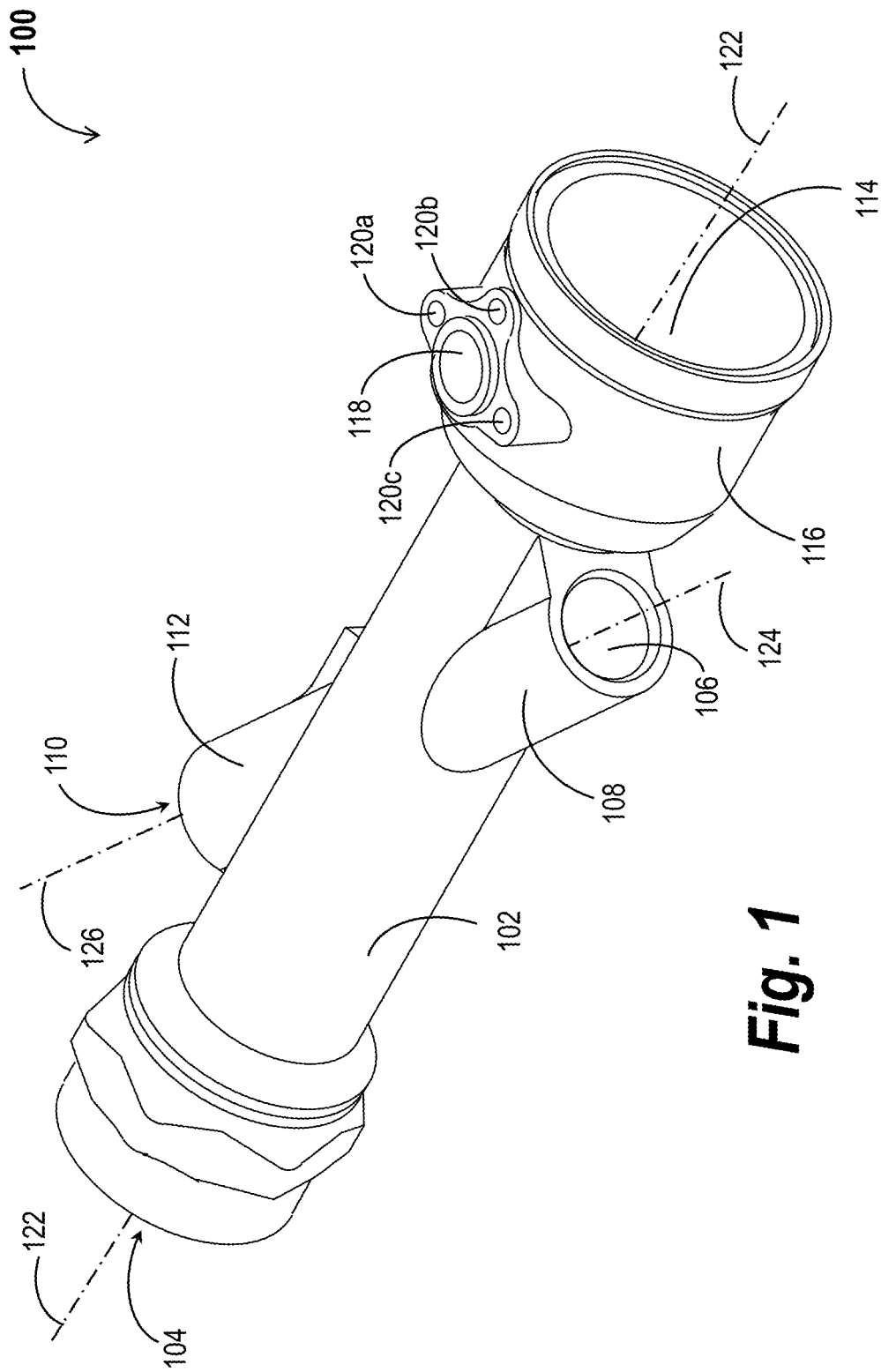
FIG. 1 depicts a perspective view of a fluid flow tube 100, according to example embodiments of the current disclosure.

Following below are more detailed descriptions of various concepts related to, and embodiments of, inventive plumbing devices and fluid flow tubes for hosting a flow meter and a shut-off valve. Also provided are detailed descriptions of inventive methods of assembling the plumbing devices. The various concepts introduced above and discussed in greater detail below may be implemented in any of numerous ways, as the disclosed concepts are not limited to any particular manner of implementation. Examples of specific implementations and applications are provided primarily for illustrative purposes.

In a building, home, factory, or field of operation, a fluid distribution system can be sourced by a single supply line (or main pipe). Placing a fluid flow monitoring system coupled to such supply line (for example placed at the head of the supply line) can allow for monitoring the fluid flow rate and/or fluid usage by the fluid distribution system. For instance, based on measured fluid flow rate values, a fluid flow meter can compute or determine the total volume of fluid passing through the supply line head into the fluid distribution system. Also, using a shut-off valve with the fluid flow meter can allow for automatic and/or proactive control of fluid flow especially when a fluid leak event, a frozen pipe event or other undesired event is detected.

Combining a fluid flow meter and a shut-off valve can be technically challenging in various ways. First, integrating a fluid flow meter and a shut-off valve in separate fluid flow tubes that are mechanically coupled to each other can increase the likelihood of a potential leak at the joint between both fluid flow tubes. Such potential leak may not be detectable or preventable. For example, if the joint between both fluid flow tubes is arranged upstream of the fluid flow meter and downstream of the shut-off valve, the fluid flow meter may not be able to detect leaks through the joint. However, if the joint between both fluid flow tubes is arranged downstream of the fluid flow meter and upstream of the shut-off valve, the shut-off valve cannot stop leaks through the joint. Also, using two separate fluid flow tubes can lead to increased size and more complex installation procedure of the system combining both the fluid flow meter and the shut-off valve. A large size of the fluid flow monitoring system can limit choices with respect to locations where the system combining both the fluid flow meter and the shut-off valve can be installed within the fluid distribution system. In addition, the use of two separate fluid flow tubes would suggest that an accurate calibration of the fluid flow meter is to be performed while both fluid flow tubes are connected to each other.

Second, even when using a single fluid flow tube to host both the fluid flow meter and the shut-off valve, several considerations are to be taken into account, for example, with regard to the type and positioning or arrangement of the fluid flow meter. For instance, using ultrasonic sensors/transducers can allow for accurate measuring of fluid flow rate when proper calibration is performed. Also, ultrasonic sensors/transducers can be integrated with the fluid flow meter according to an invasive or a non-invasive arrangement. On one hand, non-invasive installation is usually simpler and does not involve substantial plumbing, if any, but usually involves multipath signal propagation (e.g., propagation paths through the fluid and through the fluid tube wall) which can affect system accuracy. On the other hand, invasive installation of the ultrasonic sensors/transducers usually involves significant plumbing but can avoid or mitigate multipath signal propagation. Also, invasive installation of ultrasonic sensors/transducers may increase the likelihood of system failure as increased fluid pressure can displace the ultrasonic sensors/transducers. Furthermore, using sensor mounts that host the ultrasonic sensors/transducers and that are interfering with fluid flow can affect measured fluid flow parameter values (such as fluid flow speed or fluid flow rate).

Systems, devices, and methods described herein allow for a monolithic fluid flow tube capable of hosting both ultrasonic transducers and a shut-off valve. The fluid flow tube can include a primary tubular structure defining a lumen and two secondary tubular structures extending at an angle from an outer surface of the main tubular structure. The two secondary tubular structures can receive sensor mounts that are arranged to host ultrasonic sensors/transducers. The two secondary tubular structures can be arranged opposite to, and aligned with, one another to allow ultrasonic signals to travel along straight paths between the ultrasonic sensors/ transducers. The main tubular structure can have a wide portion for hosting the shut-off valve.

Arranging sensor mounts within the secondary tubular structures allows for an efficient invasive arrangement of ultrasonic sensors/transducers. Specifically, as arranged, the sensor mounts do not substantially interfere with fluid flow, which mitigates the likelihood of sensor mount displacement. Also, sensor mounts can be designed to have transverse cross sectional areas smaller than interior transverse cross sectional areas of the secondary tubular structures to avoid or mitigate ultrasonic signal propagation through the wall of the fluid flow tube. Also, the sensor mounts can be sized to fill the cavities defined by the secondary tubular structures without substantially intruding into (or interfering with) fluid flow in the lumen, or forming recess regions. Recess regions within the lumen can lead to residuum accumulation, which can affect fluid flow rate measurements.

Embodiments described herein also relate to a plumbing device including the fluid flow tube and a fitting to engage the fluid flow tube. The plumbing device can include the sensor mounts, the shut-off valve, the ultrasonic sensors/transducers, a motor for operating the shut-off valve, electronic circuitry for controlling the ultrasonic sensors/transducers and the shut-off valve, a housing, or a combination thereof.

FIG. 1 depicts a perspective view of a fluid flow tube 100, according to example embodiments of the current disclosure. The fluid flow tube 100 can be a monolithic tubular apparatus, for example, for use in a plumbing systems. The fluid flow tube 100 can include a first tubular segment (or tubular structure) 102 defining a lumen 104 for fluid flow. As used herein, a lumen is a fluid flow cavity (or a fluid flow chamber) acting as a fluid channel within a tube for conveying fluid. The fluid flow tube 100 can include a first cavity 106 defined by a second tubular segment (or tubular structure) 108, and a second cavity 110 defined by a third tubular segment (or tubular structure) 112. The fluid flow tube 100 can include a third cavity 114 defined by a fourth tubular segment (or tubular structure) 116. The fourth tubular segment 116 can include an opening 118 and one or more holes (or grooves) 120a-c (also referred to herein individually or collectively as hole(s) 120).

The lumen 104 or the first tubular segment 102 can have a cylindrical shape. In some implementations, the lumen 104 or the first tubular segment 102 can have another shape. For example, the transverse cross sectional area of the lumen 104 or transverse cross sectional area of first tubular segment 102 can have an elliptical shape (ellipse), square shape, rectangular shape, pentagonal shape, hexagonal shape, octagonal shape, or some other shape. The lumen 104 can be connected to the first cavity 106, the second cavity 110, and the third cavity 114. For instance, the lumen 104, the first cavity 106, the second cavity 110, and the third cavity 114 can form a continuous hollow space within the fluid flow tube 100. The fluid flow tube 100 can be made of brass, copper, stainless steel, or plastic (e.g., acrylonitrile Butadiene Styrene (ABS), polyvinyl chloride (PVC), chlorinated polyvinyl chloride (CPVC), cross-linked polyethylene (PEX), or other type of plastic). The fluid flow tube 100 can be made of an engineered composite material, such as glass-reinforced plastic. The fluid flow tube 100 can be manufactured using molding, welding, three-dimensional (3D) printing, another manufacturing process known in the art, or a combination thereof.

The first cavity 106 can receive a first ultrasonic sensor (not shown in FIG. 1) and can have a corresponding longitudinal axis 124 intersecting a longitudinal axis 122 of the lumen 104. The first cavity 106 can receive a first sensor mount (not shown in FIG. 1) for hosting, or that hosts, the first ultrasonic sensor. The second tubular segment 108 can be a cylindrical structure (or some other tubular structure) extending beyond the outer surface of the first tubular segment 102. The longitudinal axis 126 of the first cavity 106 (or of the second tubular segment 108) can be at a predefined angle with respect to the longitudinal axis 122 of the lumen 104. For instance, the longitudinal axis 124 of the first cavity 106 (or of the second tubular segment 108) can be at a 75° angle, 60° angle, 45° angle, 30° angle, 15° angle, or some other angle less than or equal to 90° with respect to the longitudinal axis 122 of the lumen 104. While the first cavity 106 and the second tubular segment 108 are shown to have a cylindrical shape, the transverse cross sectional area of the first cavity 106 or the transverse cross sectional area of the second tubular segment 108 can have a square shape, rectangular shape, pentagonal shape, hexagonal shape, octagonal shape, elliptical shape (ellipse), or some other shape.

Similar to the first cavity 106, the second cavity 110 defined by the third tubular segment 112 can receive a second ultrasonic sensor (not shown in FIG. 1) and can have a corresponding longitudinal axis 126 intersecting the longitudinal axis 122 of the lumen 104. The second cavity 106 can receive a second sensor mount (not shown in FIG. 1) for hosting, or that hosts, the second ultrasonic sensor. The third tubular segment 112 can be a cylindrical structure (or some other tubular structure) extending beyond the outer surface of the first tubular segment 102. The longitudinal axis 126 of the second cavity 110 (or of the third tubular segment 112) can be aligned (or substantially aligned) with the longitudinal axis 124 of the second cavity 106. Considering fault tolerance when manufacturing the fluid flow tube 100, the longitudinal axis 126 of the second cavity 108 (or of the third tubular segment 110) and the longitudinal axis 124 of the second cavity 106 may not be perfectly aligned (e.g., may be at an angle between 178° and 180°, or some other tolerable angle range, with respect to each other). Similar to the first cavity 106, the transverse cross sectional area of the second cavity 110 (or the transverse cross sectional area of third tubular segment 112) can have a square shape, rectangular shape, pentagonal shape, hexagonal shape, octagonal shape, elliptical shape (ellipse), or some other shape.

The third cavity 114 can be sized (and/or designed) to receive a shut-off valve (not shown in FIG. 1). The axis 122 can also be the longitudinal axis of the third cavity 114 (or the fourth tubular segment 116). For instance, the longitudinal axes of the lumen 104 (or the first tubular segment 106) and the third cavity 114 (or the fourth tubular segment 116) can be aligned, or substantially aligned, with each other. The third cavity 114 or the fourth tubular segment 116 can have a cylindrical shape, a conical shape (e.g., with increasing or decreasing diameter along the axis 122), or at least a partially spherical shape (e.g., a non-complete spherical or oval shape with varying diameter along the axis 122). In some implementations, the transverse cross sectional area of the third cavity 114 (or of the fourth tubular segment 116) can have a square shape, rectangular shape, pentagonal shape, hexagonal shape, octagonal shape, elliptical shape (ellipse), or some other shape. The third cavity 114 (or the fourth tubular segment 116) can have a diameter greater than the diameter of the lumen 104, or more generally can have a breadth or cross sectional area greater than a breadth or a cross sectional area of the lumen 104 (or the first tubular segment 102). The third cavity 114 (or the fourth tubular segment 116) can host a shut-off valve used to block or allow fluid flow through (or out of) the fluid flow tube 100. Fluid flow can access (or enter) the fluid flow tube 100 through the third cavity 114 or through the lumen 104 (e.g., through the other end of the fluid flow tube opposite to the third cavity 114).

The opening 118 can host or receive a stem (or shaft) of the shut-off valve that, for example, mechanically couples the shut-off valve to a corresponding motor. The stem can engage a recess or a groove of the shut-off valve. The transverse cross sectional area of the opening 118 can have a circular shape, elliptical shape, square shape, rectangular shape, pentagonal shape, hexagonal shape, octagonal shape, or some other shave. The one or more holes 120*a-c* can receive screws, pins, or other mechanical structures to attach or fix a housing or other components to the fluid flow tube 100. The holes 120 can include female threads or other mechanisms to hold the screws, pins or other mechanical structures engaging the grooves 120 tight.

As discussed in further detail below, the fluid flow tube 100 can include one or more openings or boreholes (not shown in FIG. 1) for hosting one or more sensors or hosting electric (or other) couplings to sensors or other devices arranged, for example, within the lumen 104 or within the third cavity 114. For instance, the first tubular segment (or tubular structure) 102 can include an opening or borehole to receive a pressure sensor (not shown in FIG. 1), an opening or borehole to host a thermostat or other sensor (not shown in FIG. 1), an opening or borehole to host electric or mechanical couplings to a check valve or a pressure regulator (not shown in FIG. 1), or a combination thereof. The sensors can measure one or more parameters of the fluid flow tube 100 or of fluid flowing within the fluid flow tube, such as temperature, pressure, or fluid flow velocity.

The fluid flow tube 100 can engage, or be coupled to, other tubular structures or devices, such as a pipe, a nut, a fitting, a hose, the like, or a combination thereof. The first tubular segment 102 can include a female or male thread (e.g., straight or tapered thread), or other mechanical structures, e.g., at a corresponding end of the fluid flow tube 100, to engage (or mechanically couple to) pipes, fittings, or other tubular structures or devices. The third tubular segment 116 can include a female or male thread (e.g., straight or tapered thread), or other mechanical structures, e.g., at a corresponding end of the fluid flow tube 100, to engage (or mechanically couple to) pipes, fittings, or other tubular structures or devices.

Figure 2A:
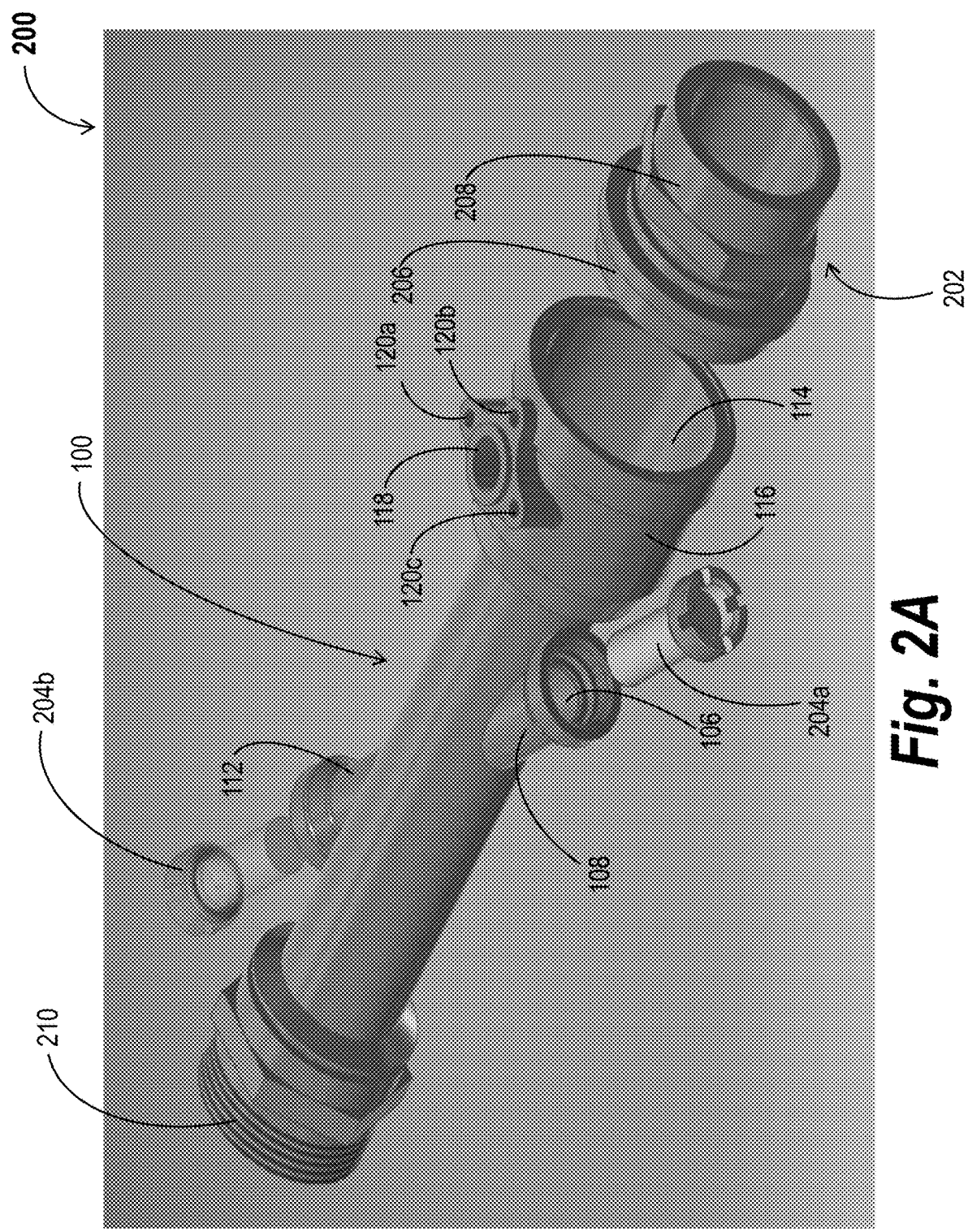
FIGS. 2A-2C show perspective and sectional views of a plumbing device, according to example embodiments of the current disclosure.
Figure 2B:
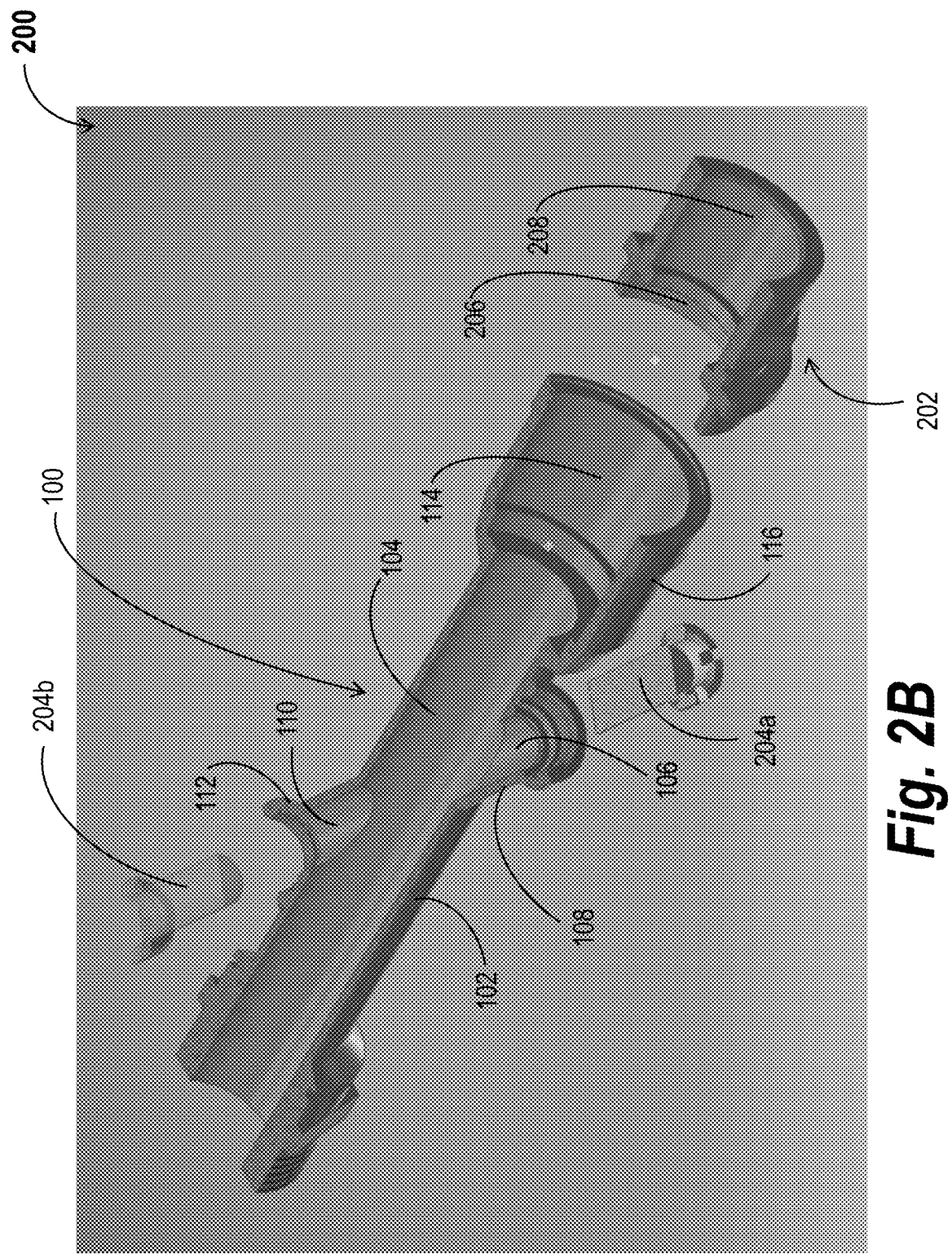
Figure 2C:
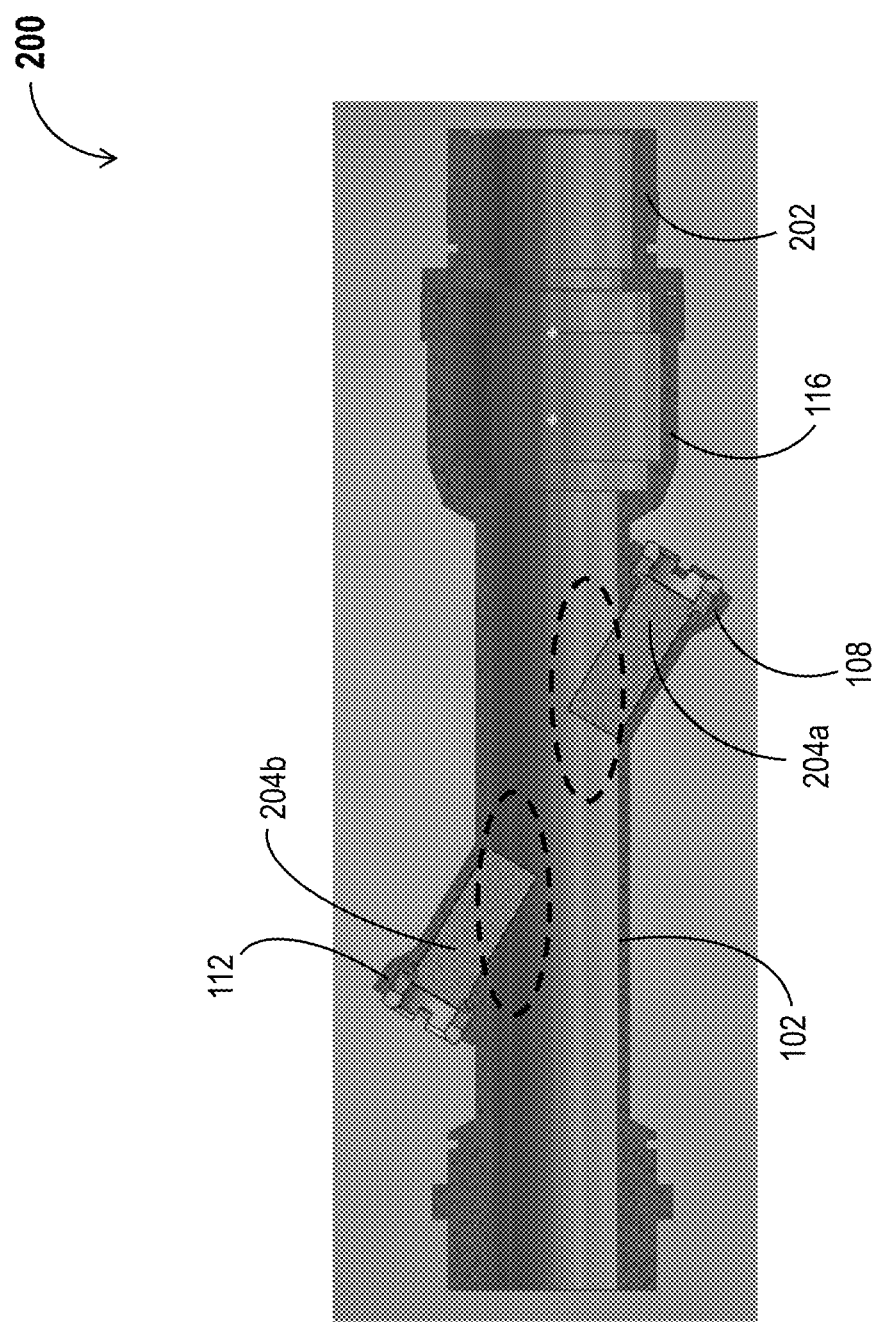

FIGS. 2A-2C show perspective and sectional views of a plumbing device 200, according to example embodiments of the current disclosure. The plumbing device 200 can include the monolithic fluid flow tube 100, discussed above with regard to FIG. 1, and a fitting 202 configured to engage the fluid flow tube 100 at a corresponding end of the fluid flow tube 100. The plumbing device 200 can also include sensor mounts 204*a* and 204*b* (also referred to herein individually or collectively as sensor mount(s) 204) for hosting ultrasonic transducers (not shown in FIGS. 2A-2C. FIG. 2A shows a perspective view of the plumbing device 200 with the fitting 202 and the sensor mounts 204 being detached from the fluid flow tube 100. FIG. 2B shows a sectional view of the plumbing device 200 with the fitting 202 and the sensor mounts 204 being detached from the fluid flow tube 100. FIG. 2C shows a perspective view of the plumbing device 200 with the fitting 202 and the sensor mounts 204 engaging (or attached to) the fluid flow tube 100.

The fitting 202 can engage the fourth tubular segment 116 at a corresponding end of the fluid flow tube 100. The fitting may have a first portion 206 having a first diameter (or first cross-sectional area) to engage the fluid flow tube 100, and a second portion 208 with a second diameter (or second cross-sectional area) smaller than the first diameter (or smaller than the first cross-sectional area) and at an opposite end of the fitting 202 compared to the first portion 206. The second portion 208 can engage a pipe or other tubular structure. The third cavity 114 can receive the first portion 206 of the fitting 202 as illustrated in FIGS. 2A-2C. The depth of the first portion 206 may be sized so that the first portion 206 does not come into contact with the shut-off valve within the third cavity 114. In some implementations, the first portion 206 of the fitting 202 can be sized to receive a portion of the tubular segment 116.

The fitting 202 can include a push-to-connect fitting where the first portion 206 can be pushed inside the third cavity 114 of the fluid flow tube. In some implementations, a portion of the third tubular segment 116 can be pushed inside the first portion 206 of the fitting 202. For a push-to-connect fitting, the fitting 202 can include a grip ring, lock claws, lips, indents, protrusions, or a combination thereof to hold the fluid flow tube 100 or the tubular segment 116 in place. In some implementations, the fourth tubular segment 116 may include one or more grip rings, one or more sealing rings, lock claws, indents, protrusions, lips, or a combination thereof to hold the fitting 202 in place. In some implementations, mechanical structures such as a grip ring, lock claws, indents, lips, or protrusions may be arranged (or distributed) among the fitting 202 and the fourth tubular segment 116 of the fluid flow tube 100.

The fitting 202 can engage the fluid flow tube 100 through threads on both sides. For instance, the end of the fitting facing the fluid flow tube 100 (or the first portion 206) can include a male thread whereas the interior of the fourth tubular segment 116 can include a female thread to engage the male thread of the fitting 202. Alternatively, the end of the fitting facing the fluid flow tube 100 (or the first portion 206) can include a female thread whereas a portion of the outer surface of the fourth tubular segment 116 can include a male thread to engage the female thread of the fitting 202. In some implementations, the fitting 202 may act as a push-to-connect fitting on one end and may include a male or female thread on the other end. For example, the fitting 202 may engage the fluid flow tube 100 through a push-to-connect mechanism, and engage a pipe (or other tubular structure) through a thread at the other end of the fitting 202. In another example, the fitting 202 may include a male or female thread at the first portion 206 to engage another thread (e.g., female or male thread) of the fluid flow tube 100, and may engage a pipe (or other tubular structure) through a push-to-connect mechanism at the other end of the fitting 202.

The fitting 202 can be made of brass, copper, stainless steel, or plastic (e.g., acrylonitrile Butadiene Styrene (ABS), polyvinyl chloride (PVC), chlorinated polyvinyl chloride (CPVC), cross-linked polyethylene (PEX), or other type of plastic), an engineered composite material, such as glass-reinforced plastic, or a combination thereof. The fitting 202 can be manufactured using molding, welding, three-dimensional (3D) printing, another manufacturing process known in the art, or a combination thereof. O-rings, other mechanical structures, adhesive, or a combination thereof can be used with the fitting to provide a sealing and prevent fluid leakage through the connection between the fitting 202 and the fluid flow tube 100.

The fluid flow tube 100 can include a thread 210 at a respective end opposite to the fourth tubular segment 116.

While the thread 210 is shown to be a male thread in FIG. 2A, in some other implementations, the thread 210 can be a female thread. The thread 210 can engage another thread of a pipe or other tubular structure (e.g., a nut, a pipe, a hose, etc.) to be connected to the fluid flow tube. In some implementations, the fluid flow tube 100 may engage the pipe or other tubular structures (e.g., a fitting, a hose, etc.) through other mechanisms such as push-to-connect, soldering, adhesive, or a combination thereof at the end of the fluid flow tube 100 opposite to the fourth tubular segment 116.

The plumbing device 200 can include a pair of sensor mounts 204a and 204b. The first cavity 106 can receive the sensor mount 204a, while the second cavity 110 can receive the sensor mount 204b. Each of the sensor mounts 204a and 204b can host a respective ultrasonic transducer (not shown in FIGS. 2A-2C). The ultrasonic transducers can be two thin-film or disk piezoelectric transducers. Each of the ultrasonic transducers can transmit or receive ultrasonic signals. One ultrasonic transducer can transmit ultrasonic signals to propagate through the corresponding sensor mount 204, into the lumen 104, and then through the opposite sensor mount 204 to be received by the other ultrasonic transducer located at the opposite cavity 106 or 110. Each of the ultrasonic transducers can alternately operate as transmitter or receiver. When the sensor mounts 204 are placed within the cavities 106 and 110, the longitudinal axes of the sensor mounts 204a and 204b can be aligned, or substantially aligned (e.g., forming and angle between 178° and 180° or within another tolerable angle range). The alignment of the sensor mounts 204a and 204b, or the corresponding longitudinal axes, allows for the corresponding transducers to face each other. According to such arrangement, ultrasonic signals can propagate along a straight (or substantially straight) path between the ultrasonic transducers.

When the sensor mounts 204 are placed within the cavities 106 and 110, each of the sensor mounts 204 can include a corresponding portion intruding in the lumen 104 and physically interfering with fluid flow in the lumen 104. In particular, the portions of the sensor mounts 204 indicated by the dashed ellipses in FIG. 2C reside (or are arranged) across the fluid flow path within the lumen 104. The sensor mounts 204 are described in further details below.

Figure 3A:
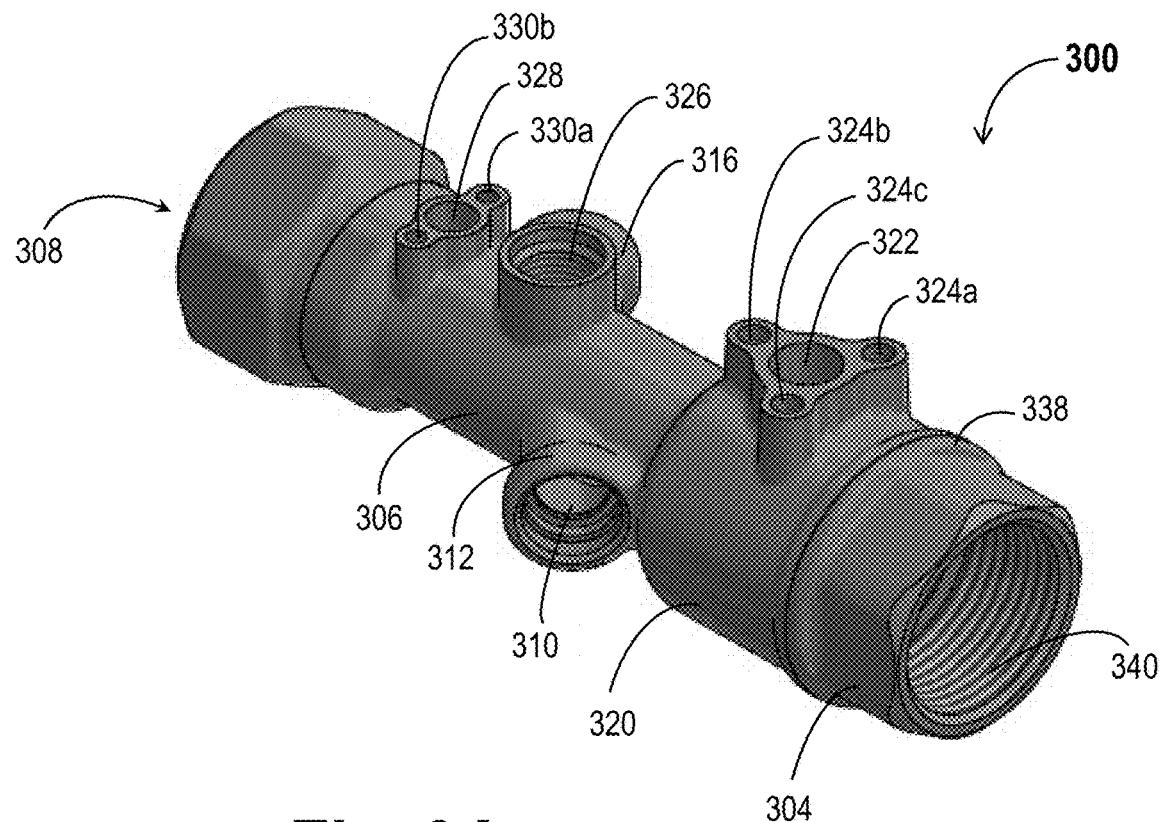
FIGS. 3A and 3B show a perspective view and a bottom view, respectively, of another plumbing device, according to example embodiments of the current disclosure.
Figure 3B:
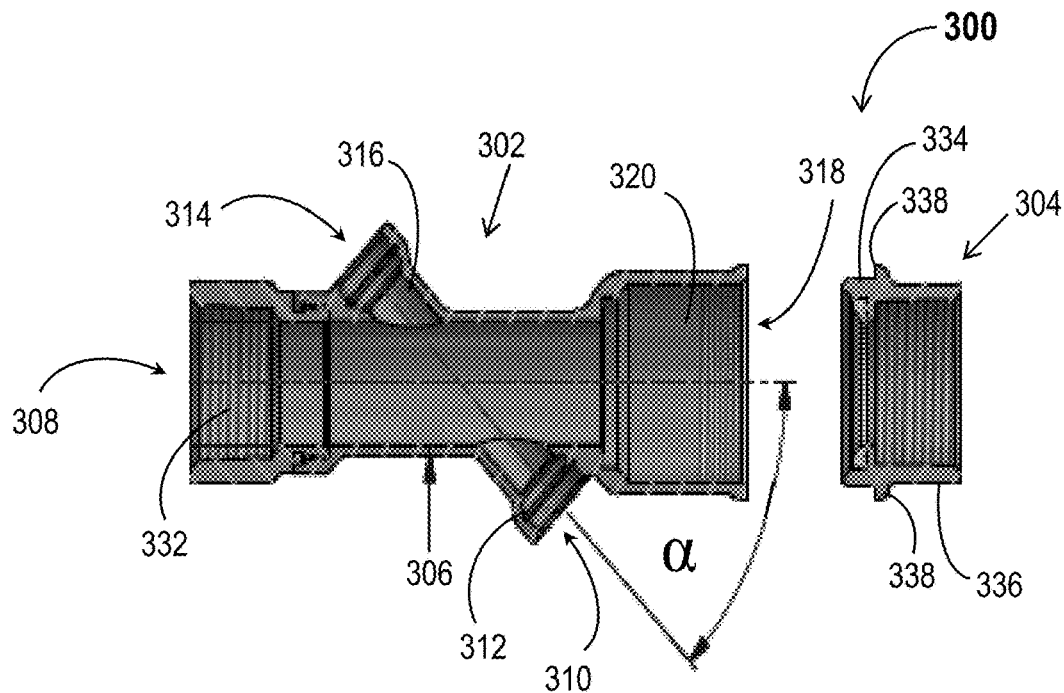

FIGS. 3A and 3B show a perspective view and a bottom view, respectively, of another plumbing device 300, according to example embodiments of the current disclosure. The plumbing device 300 can include fluid flow tube 302 and a fitting 304 engaging the fluid flow tube 302 at a corresponding end. The fluid flow tube 302 can be a monolithic tubular apparatus or piece. Similar to the fluid flow tube 100, the fluid flow tube 302 can include a first tubular segment (or tubular structure) 306 defining a lumen 308 that acts as a fluid flow channel, a first cavity 310 defined by a second tubular segment (or tubular structure) 312, a second cavity 314 defined by a third tubular segment (or tubular structure) 316, and a third cavity 318 defined by a fourth tubular segment (or tubular structure) 320. The first cavity 310 can receive a first sensor mount for hosting a first ultrasonic transducer, and the second cavity 312 can receive a second sensor mount for hosting a second ultrasonic sensor (not shown in FIGS. 3A and 3B). The first and second cavities 310 and 312 can have corresponding longitudinal axes intersecting the longitudinal axis of the lumen 308. The first and second cavities 310 and 312 (or the corresponding axes) can be aligned with each other at an angle $\alpha$ with respect to the lumen 308 or a longitudinal axis of the lumen 308. The angle $\alpha$ can be greater than 0° and less than or equal to 90°.

In some implementations, the angle $\alpha$ may be equal to 30°, 45°, 60°, or any angle between 15° and 75°. The third cavity 318 (or the fourth tubular segment 320) can be sized to receive a shut-off valve, and can have a diameter (or a transverse cross sectional area) greater than a diameter (or a transverse cross sectional area) of the lumen 308. The longitudinal axis of the fourth tubular segment 320 (or of the third cavity 318) can be aligned (or substantially aligned) with the longitudinal axis of the lumen 308 or the first tubular segment 306.

Similar to the fluid flow tube 100, the fourth tubular segment 320 of the fluid flow tube 302 can include an opening (or borehole) 322 for receiving a stem of the shut-off valve (not shown in FIGS. 3A and 3B), and one or more holes (or grooves) 322a-c (also referred to herein individually or collectively as hole(s) 322) for receiving pins, rods, screws, or other structures to mechanically couple a housing, electric boards, or other structures to the fluid flow tube 302. While FIGS. 3A and 3B show three holes (or groves) 324, the number of such holes (or grooves) 324 can be one, two, four, or other number. Also, the location(s) of the holes (or grooves) 324 may be arranged differently. For instance, the holes (or grooves) 324 may be arranged along a line segment or at four corners of a square or a rectangle, instead of forming a triangular shape. The first opening 322 and/or the hole(s) 324 (or corresponding longitudinal axes) can be perpendicular, or substantially perpendicular, to the lumen 308 or the longitudinal axis of the lumen 308.

The fluid flow tube 302 (or the first tubular segment 306) can include a second opening (or borehole) 326, for example, for hosting a pressure sensor (not shown in FIGS. 3A and 3B). The pressure sensor can be fixed or locked within the second opening (or borehole) 326 using a female thread at the opening 326 and a male thread at a structure associated with the pressure sensor, a push-to-connect mechanism (e.g., employing one or more grip rings, one or more sealing rings, lock claws, indents, protrusions, lips, or a combination thereof), adhesive, soldering, or a combination thereof. The second opening (or borehole) 326 or a corresponding longitudinal axis can be perpendicular, or substantially perpendicular (e.g., at an angle between 85° and 90°), to the longitudinal axis of the lumen 308.

The fluid flow tube 302 (or the first tubular segment 306) can also include a third opening (or borehole) 328, for example, for hosting or receiving a temperature sensor (e.g., a thermocouple), density sensor, fluid level sensor, other sensor(s), electric or mechanical couplings (e.g., electric wires) to other sensors or devices (e.g., a check valve, a pressure regulator, or other sensors) arranged within the lumen 308, or a combination thereof. The sensor(s) can be fixed or locked within the third opening (or borehole) 328 using a female thread at the opening 328 and a male thread at a structure associated with the sensor(s), a push-to-connect mechanism (e.g., employing one or more grip rings, one or more sealing rings, lock claws, indents, protrusions, lips, or a combination thereof), adhesive, soldering, or a combination thereof. The third opening (or borehole) 328 or a corresponding longitudinal axis can be perpendicular, or substantially perpendicular (e.g., at an angle between 85° and 90°), to the longitudinal axis of the lumen 308 or the tubular segment 306.

The fluid flow tube 302 can include a female thread 332 (e.g., straight or tapered thread) arranged at end of the first tubular segment 306 opposite to the fourth tubular segment 320 or the third cavity 318. The female thread 332 can engage a male thread (not shown in FIGS. 3A and 3B) of a pipe or other tubular structure. The thread 332 may be arranged at an end of the first tubular segment 306 (e.g., a portion of the tubular segment 306 shaped as a nut), or at a swivel nut attached to the tubular segment 306. In some implementations, the end of the first tubular segment 306 opposite to the fourth tubular segment 320 or the third cavity 318 may engage or connect to the pipe (or other tubular structure) via a male thread (instead of a male thread), a push-to-connect mechanism, adhesive, soldering, or a combination thereof.

The plumbing device 300 can include the fitting 304 for engaging the fluid flow tube 302 at an end of the fourth tubular segment 320 (or an end of the third cavity 318). The fitting 304 can include a first tubular portion (or tubular end) 334 to engage the fluid flow tube 302 or the fourth tubular segment 320, and a second tubular portion (or tubular end) 336 to engage a pipe or other tubular apparatus. The first tubular portion 334 and the second tubular portion 336 can be separated by a ridge structure 338. The fourth tubular segment 320 of the fluid flow tube 302 can receive the first tubular portion 334 of the fitting 304, for example, until the ridge structure 338 comes into contact with or engages the end of the tubular segment 320. The ridge structure 338 can act as an obstruction so that only the first tubular portion 334 of the fitting 304 can go into the third cavity 318. The first tubular portion 334 of the fitting 304 can engage the fourth tubular segment 320 of the fluid flow tube 302 via push-to-connect mechanism, threads, or other mechanical coupling mechanisms. The second tubular portion 336 of the fitting 304 can include a female thread 340 (e.g., a straight or tapered thread) to engage a corresponding male thread of a pipe or other tubular structure. The second tubular portion 336 of the fitting 304 can have a shape of a nut, a cylindrical shape, or other shape.

Figure 4A:
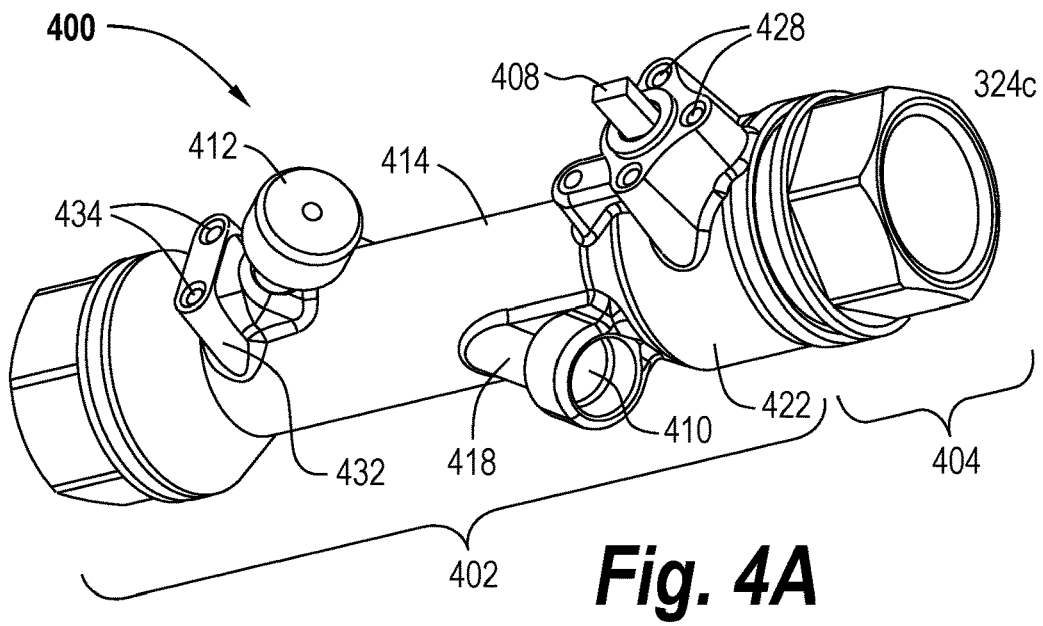
FIGS. 4A and 4B-4C show a perspective view and two sectional views, respectively, of yet another plumbing device, according to other example embodiments of the current disclosure.
Figure 4B:
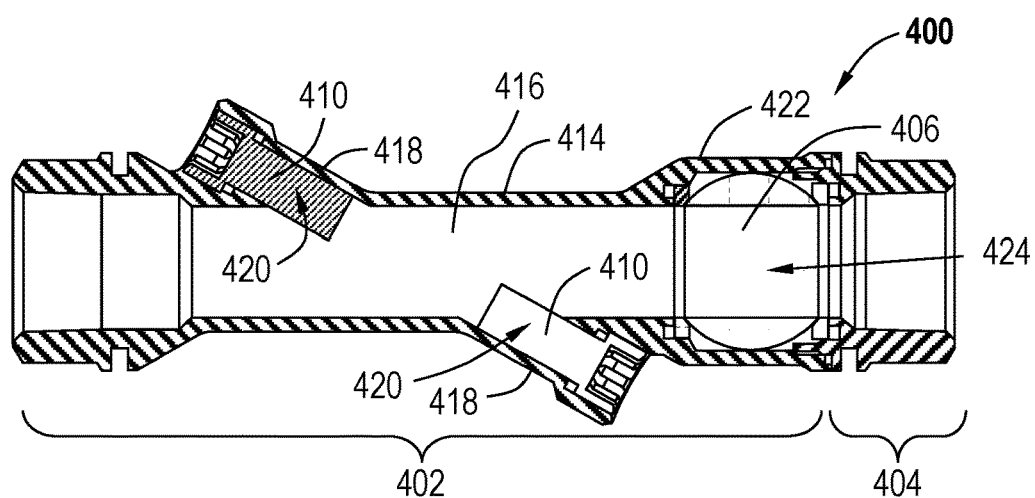
Figure 4C:
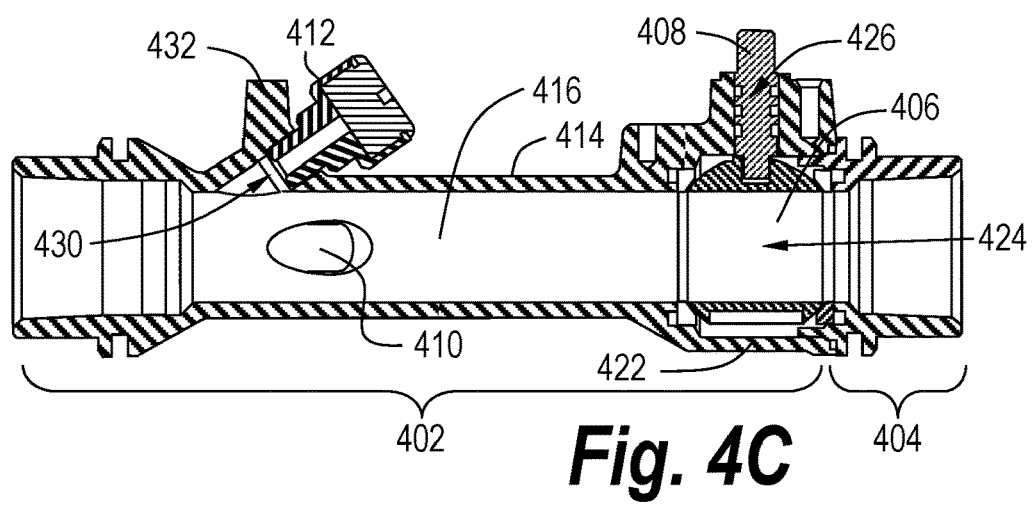

FIGS. 4A-4C show various views of yet another plumbing device 400, according to other example embodiments of the current disclosure. Specifically, FIG. 4A shows a perspective view the plumbing device 400, whereas FIGS. 4B and 4C show two distinct sectional views of the plumbing device 400. The plumbing device 400 can include a fluid flow tube 402, a fitting 404 engaging the fluid flow tube 402 at a corresponding end, a shut-off valve 406 for blocking or allowing fluid flow within (or out of) the fluid flow tube 402, a valve stem (or shaft) 408 for mechanically coupling the shut-off valve 406 to a motor (not shown in FIGS. 4A-4C), a pair of sensor mounts 410 for hosting ultrasonic transducers (not shown in FIGS. 4A-4C), and a pressure sensor 412 for measuring fluid pressure within the fluid flow tube 402. The ultrasonic transducers, the motor, or a combination thereof may be viewed as parts of the plumbing device 400.

The fluid flow tube 402 can be a monolithic tubular apparatus (or tubular piece) which can include a first tubular segment (or tubular structure) 414 defining a corresponding lumen 416 through which fluid flows, a second and third tubular segments (or tubular structures) 418 defining, respectively, a first and second cavities 420 for receiving the sensor mounts 410, and a fourth tubular segment (or tubular structure) 422 defining a third cavity 424 for hosting the shut-off valve (e.g., a ball valve) 406. The first and second cavities 420 (or the second and third tubular segments 418) can be aligned, or substantially aligned, with each other and can have a common longitudinal axis (or substantially aligned longitudinal axes) arranged at an angle with respect to a longitudinal axis of the lumen 416 (or the first tubular segment 414). The angle can be between 0° and 90°, such as about 30°, about 45°, or about 60° (considering manufacturing tolerance error). The third cavity 420, or the fourth tubular segment 422, hosting the shut-off 406 valve can be viewed as a continuum of the lumen 416, or the first tubular segment 414. The third cavity 420, or the fourth tubular segment 422, can have a diameter (or a transverse cross sectional area) larger than the diameter (or the transverse cross sectional area) of the lumen 416. The fourth tubular segment 422 can include an opening 426 for hosting the valve stem 408. The fourth tubular segment 422 can include one or more grooves (or holes) 428 to receive pins, rods, screws, or other mechanical coupling structures for coupling a housing to the fluid flow tube 402.

The fluid flow tube 402, or the first tubular segment 414, can include an opening (or a borehole) 430 for receiving or hosting the pressure sensor 412. The opening 430 can have a longitudinal axis intersecting with the longitudinal axis of the first tubular segment 414 (or the lumen 416). The fluid flow tube 402 (or the first tubular segment 414) can also include a protrusion (or ridge) structure 432 arranged proximate to the opening 430. For instance, the opening 430 can extend, into the wall of the first tubular segment 414 beneath or contiguous to the protrusion (or ridge) structure 432. The protrusion (or ridge) structure 432 can include one or more grooves (or holes) 434 for receiving one or more pins, rods, screws, or other mechanical coupling structures to mechanically couple the housing, circuit boards, or other components to the fluid flow tube 402. For instance, the openings 434 and the openings 428 together can receive the pins, rods, screws, or other mechanical coupling structures to mechanically couple other components to the fluid flow tube 402. The number and arrangement of the openings 428 and 434 can vary depending, for example, on the design of the fluid flow tube 402.

The fitting 404 can engage, at a first respective end, the fourth tubular segment 422 via a push-to-connect mechanism, a thread, adhesive, other mechanical coupling mechanism, or a combination thereof. The fitting 404 can also engage, at a second respective end, a pipe, a hose, or other tubular structure via a push-to-connect mechanism, a female thread, adhesive, other mechanical coupling mechanism, or a combination thereof. The fluid flow tube 402 can connect, at a corresponding end opposite to third cavity 424, to a pipe, a hose, or other tubular structure via a push-to-connect mechanism, a female thread, adhesive, other mechanical coupling mechanism, or a combination thereof.

The fluid flow tubes 100, 302, and 402, and the plumbing devices 200, 300, and 400 describe various embodiments of apparatuses for hosting a shut-off valve and a fluid flow meter. Other embodiments, of the fluid flow tube and the plumbing device are also contemplated by this disclosure. In particular, additional embodiments of the fluid flow tube or the plumbing device can be achieved by combining features described with respect to FIGS. 1-4B. Also, other embodiments may be achieved, for example, by varying the number, shape(s), location(s), or arrangement of the grooves (or holes) for receiving pins, rods or screws to couple the fluid flow tube to other components (e.g., housing). The number and types of sensors (e.g., pressure sensor, thermostat, etc.) and the number, shape(s), location(s), and arrangement of the openings to accommodate such sensors may vary based on, for example, various designs of the fluid flow tube or the plumbing device.

The plumbing device may be viewed as including only the fluid flow tube and fitting, or including the fluid flow tube, the fitting, and a combination of additional components (e.g., sensor mounts, ultrasonic transducers, pressure sensor, temperature sensor (e.g., a thermocouple or another temperature sensor), fluid level sensor, check valve, pressure regulator, shut-off valve, valve stem, motor, electronic components or boards, or a combination thereof). Different versions of the plumbing device described herein may be manufactured depending, for example, on the combination of sensors and components integrated into the plumbing device.

Figure 5:
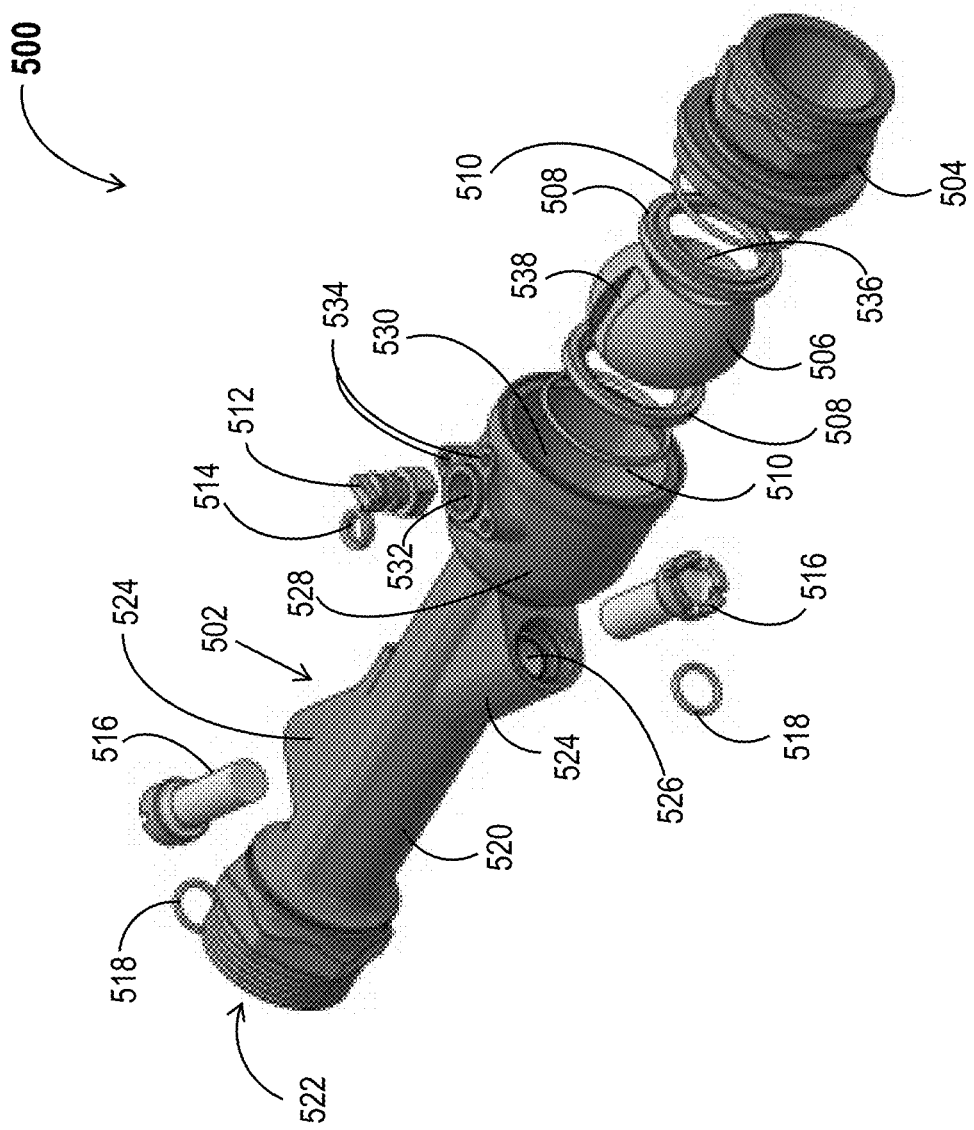
FIG. 5 shows a respective view of an ensemble of components forming a plumbing device, according to example embodiments of the current disclosure.

FIG. 5 shows a respective view of an ensemble of components forming a plumbing device 500, according to example embodiments of the current disclosure. The plumbing device 500 can include a fluid flow tube 502, a fitting 504, a shut-off valve 506, a pair of ball valve seating rings (or gaskets) 508, a pair of sealing rings (or O-rings) 510, a valve stem 512, a stem O-ring 514, a pair of sensor mounts (or transducer mounts) 516, and a pair of sensor mount O-rings 518.

While the fluid flow tube 502 and the fitting 504 are shown to be similar, respectively, to the fluid flow tube 100 and the fitting 202 shown in FIGS. 2A-2C, in general, any fluid flow tube and/or any fitting described or contemplated with respect to any of FIGS. 1-4B can be used in the plumbing device 500.

The fluid flow tube 502 can include a first tubular segment (or tubular structure) 520 defining a corresponding lumen 522 for conveying fluid flow, a second and third tubular segments 524 defining, respectively, a first and second cavities 526 for receiving the sensor mounts (or transducer mounts) 516, and a fourth tubular segment 528 defining a third cavity 530 for receiving (or hosting) the shutoff valve 506. The second and third tubular segments 524 (or the first and second cavities 526) can be aligned (or substantially aligned) with each other and can have a respective longitudinal axis intersecting with (or oriented at an angle with respect to) a longitudinal axis of the lumen 522. The fourth tubular segment 528 can be aligned with the first tubular segment 520, and the third cavity 530 can have a diagonal (or a transverse cross sectional area) larger than the diameter (or the transverse cross sectional area) of the lumen 522. The fourth tubular segment 528 can include an opening 532 for receiving the valve stem 512, and one or more grooves 534 for receiving pins, rods, screws, or other mechanical coupling structures to couple the fluid flow tube 502 to other components (e.g., housing, electronic boards, motor, or a combination thereof).

The shut-off valve 506 can include a ball valve having a tubular cavity 536 for conveying fluid through the shut-off valve 506, and a recess (or groove) 538 to receive the valve stem 512. When rotated by the motor (not shown in FIG. 5), the valve stem 512 can engage the recess 538 to rotate the shut-off valve 506. When the shut-off valve 506 is oriented such that the tubular cavity 536 (or a longitudinal axis thereof) is perpendicular, or substantially perpendicular (e.g., at an angle between 85° to 95° or other angle range depending on the diameter of the tubular cavity 536), to the longitudinal axis of the lumen 522, the shut-off valve 506 is closed (or at a close state), blocking fluid from passing through the third cavity 530. When the tubular cavity 536 (or the longitudinal axis thereof) is arranged at an angle relative to the lumen 522 (or the corresponding longitudinal axis) such that at least a portion of the tubular cavity 536 is facing the lumen 522, fluid can flow from the lumen 522 through the tubular cavity 536. Maximum fluid flow through the tubular cavity 536 can be achieved when the tubular cavity 536 (or the longitudinal axis thereof) is aligned with the lumen 522 (or the corresponding longitudinal axis).

The ball valve seating rings (or gaskets) 508 and the sealing rings (or O-rings) 510, individually or in combination, can provide a seal to prevent fluid leakage between the outer surface of the shut-off valve 506 and the inner surface of the third cavity 530. Also, the ball valve seating rings (or gaskets) 508 can prevent displacement of the ball valve 506 by exerting mechanical force or mechanical pressure on the ball valve 506 from two opposite directions. Specifically, when the fitting 504 is engaged (or pushed) against/into the fourth tubular segment 528, the ball valve seating rings (or gaskets) 508 can be arranged against the ball valve 506, keeping the position of the ball valve 506 fixed (e.g., with little or no wiggling margin). The ball valve seating rings (or gaskets) 508 can be shaped to allow the ball valve 506 to rotate along an axis of the valve stem 512. For instance, each ball valve seating ring (or gasket) 508 can include a respective recess to receive the ball valve 506. The stem O-ring 514 can provide a sealing between the stem valve 512 and the opening 532 to prevent fluid leakage between the outer surface of the stem valve 512 and the inner surface of the opening 532.

Each sensor (or transducer) mount 516 can be arranged into a corresponding second cavity 526. For instance, each sensor (or transducer) mount 516 can be pushed or screwed into one of the second cavities 526. When arranged in the second cavities 526, longitudinal axes of the sensor (or transducer) mounts 516 can be aligned (or at least substantially aligned when considering manufacturing tolerance error). The alignment of the sensor (or transducer) mounts 516, or the corresponding longitudinal axes, allows for ultrasonic signals to travel along straight paths (e.g., without reflecting off inner walls/surfaces of the fluid flow tube 502) between the ultrasonic transducers arranged at the sensor (or transducer) mounts 516. Each sensor mount O-ring 518 can be arranged into a corresponding second cavity 526 to provide a sealing between that second cavity 526 and the corresponding sensor (or transducer) mount 516. The sensor mount O-ring 518 can prevent fluid leakage between the outer surface of the sensor (or transducer) mount 516 and the inner surface of the second cavity 526.

The ultrasonic sensors (or ultrasonic transducers) can be part of the plumbing device 500. The plumbing device 500 can also include other sensors or components, such as a pressure sensor, an inline leak detector, a thermocouple, a density sensor, a fluid level sensor, a check valve, a pressure regulator, or other sensor or devices. For instance, as discussed with regard to FIGS. 3A-3B and 4A-4C, the fluid flow tube 502 can include one or more boreholes to receive one or more sensors, such as the pressure sensor 412 shown in FIGS. 4A and 4C, or electric or mechanical couplings to sensors or devices arranged, for example, within the lumen 522 (e.g., an inline leak detector). For example, an inline leak detector (e.g., an impeller-based inline flow sensor) can allow for distinguishing between false fluid flows (e.g., detected by the ultrasonic fluid flow meter) and relatively low flow rate fluid flows that may be indicative of a fluid leak event. Inline leak detectors can accurately detect (or measure) relatively small fluid flow rates, such as flow rates less than or equal to 0.1, 0.2 or 0.3 gallon per minute (GPM).

Figure 6C:
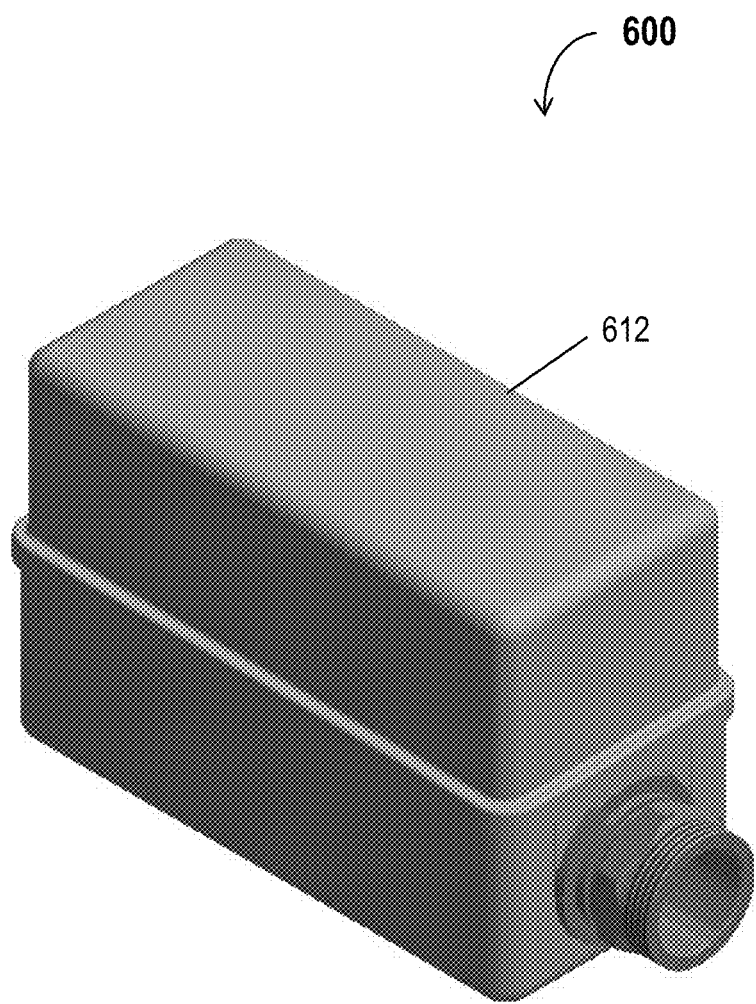

Referring to FIGS. 6A-6C, various views of a plumbing device 600 combing an ultrasonic fluid flow meter and a shut-off valve are shown, according to example embodiments of the current disclosure. The plumbing device 600 can include a combined fluid flow tube assembly 602, a sensor interface circuit board 604, a dive board 606, and a motor assembly 608. The plumbing device 600 can include at least one control circuit board such as control circuit boards 610a and 610b, referred to hereinafter individually or collectively as control circuit board(s) 610. The plumbing device 600 can include a housing 612.

The combined fluid flow tube assembly 602 can include a fluid flow tube (e.g., as discussed with regard to FIGS. 1-5), a fitting (e.g., as discussed with regard to FIGS. 2A-5), a shut-off valve, a valve stem, a pair of sensor mounts (or transducer mounts), a shut-off valve, a valve stem, a pair of sensor mounts (or transducer mounts), a pressure sensor, a thermocouple, other sensor(s) or component(s), or a combination thereof. For instance, the combined fluid flow tube assembly 602 can include the plumbing device 500 described with regard to FIG. 5. The combined fluid flow tube assembly 602 can also include electrical and mechanical components to operate the shut-off valve and ultrasonic sensors arranged within the sensor (or transducer) mounts.

The sensor interface circuit board 604 can be electrically coupled to one or more sensors associated with, or integrated in, the fluid flow tube assembly 602. For example, the sensor interface circuit board 604 can be electrically coupled to the ultrasonic sensors, pressure sensor, thermocouple, inline leak detector, fluid level sensor, density sensor, density sensor, or a combination thereof. The sensor interface circuit board 604 can include one or more power amplifiers, one or more comparators, other electric components, or electric circuits to process (e.g., amplify, compare, filter, or a combination thereof) signals received from the sensors. The sensor interface circuit board 604 can be electrically coupled to control circuit board 610. In some implementations, the sensors associated with the fluid flow tube assembly 602 may be electrically coupled directly to the control circuit board 610 (e.g., not via a sensor interface circuit board 604).

The dive board 606 can be a mechanical structure for seating the motor assembly 608 and/or the control circuit board(s) 610. The dive board 606 can include bearing walls (or bearing structures) 614 to withstand the load associated with the dive board 604. Each bearing wall 614 can have a concave curved edge for engaging the fluid flow tube or the fitting. The dive board 606 can also include a plurality of posts (or rod structures) 616 arranged orthogonal to a main planar structure of the dive board 606. Each post 616 can include a corresponding protrusion. The protrusions can be arranged to provide seating (or physical support) for the control circuit board(s) 610. For instance, the control circuit board(s) 610 can stand between the posts 616 on the corresponding protrusions. In some implementations, the control circuit board(s) 610 include opening (or holes) to receive the posts 616.

The motor assembly 608 can include a motor (not shown in FIGS. 6A-6C) for rotating the shut-off valve (not shown in FIGS. 6A-6C) integrated within the combined fluid flow tube assembly 602. The motor assembly 608 can be arranged on the dive board 606 above (or at a same level as) the hollow structure of the fluid flow tube enclosing the shut-off valve. Specifically, the motor assembly 608 can be arranged such that the motor (or a corresponding mechanical structure) can engage the valve stem. When actuated, the motor can cause the stem and the shut-off valve to rotate by about 90° (e.g., by an angle between 85° and 95° or other angle range around 90°) to block or allow fluid flow through the fluid flow tube. Referring back to FIG. 5, when the valve stem 512 is rotated by the motor, the valve stem 512 can engage and exert a force on the recess 538 to cause the shut-off valve 506 to rotate and cause the tubular cavity 536 to be aligned with the lumen 522 (to allow fluid flow through the fluid flow tube), or orthogonal to the lumen 522 (to block fluid flow through the fluid flow tube 502).

Referring back to FIGS. 6A-6C, the control circuit board 612a can include circuitry to control or operate the transducer sensors and process signals obtained by the transducer sensors or other sensors integrated in the combined fluid flow tube assembly 602. The control circuit board 612b can include circuitry to control or operate the motor. The control circuit boards 612a and 612b can be electrically coupled to each other. In some implementations, the control circuit boards 612a and 612b can be designed or integrated as a single control circuit board 612.

The control circuit board(s) 612 can include an analog-to-digital converter (ADC), a digital-to-analog converter, DAC), one or more power amplifiers, a processor (e.g., a microprocessor, an application specific instruction-set processor (ASIP), a digital signal processor (DSP), an application specific integrated circuit (ASIC), or other type of processor), a controller, or a combination thereof. For instance, a controller can control electric power supplied to the motor when the motor is actuated. Also, one or more power amplifiers can amplify signals obtained by the ultrasonic sensors/transducers or other sensors integrated within the combined fluid flow tube assembly 602, and the ADC can sample such signals into corresponding digital signals that are processed by the processor. The DAC can convert, for example, digital signals provided by the processor to corresponding analog signals that are fed to the ultrasonic sensors/transducers or other components.

The processor can cause a first ultrasonic sensor/transducer to transmit an ultrasonic signal that is received by the second ultrasonic sensor/transducer. For instance, the processor can provide a digital signal that is converted into a corresponding analog signal by the DAC. The first ultrasonic sensor/transducer can convert the analog signal into an ultrasonic signal, and transmit the ultrasonic signal into the fluid flow tube. The second ultrasonic sensor/transducer can receive a delayed version of the ultrasonic signal and convert it into a corresponding analog electric signal. The second ultrasonic sensor/transducer can provide the analog signal to the ADC for converting to a digital signal that is provided to the processor. The processor can compare the received digital signal to a reference signal to determine a time delay or a phase shift between the two signals. The reference signal may correspond to an ultrasonic signal received by the second ultrasonic sensor/transducer responsive to transmission of another ultrasonic signal by the first ultrasonic sensor/transducer during a still state (no flow) of the fluid in the fluid flow tube. The reference signal may correspond to an ultrasonic signal received by the first ultrasonic sensor/transducer responsive to transmission of another ultrasonic signal by the second ultrasonic sensor/transducer.

The processor can determine a time delay or a phase shift between the received digital signal and the reference signal. For example, the processor can compute a cross-correlation signal between the received digital signal and the reference signal, and determine the time delay based on the location of the peak of the cross-correlation signal. The processor may compute the fast Fourier transforms (FFTs) of the received digital signal and the reference signal, compute the phase difference between the FFTs of the received digital signal and the reference signal, and determine the time delay between both signals based on the computed phase difference. Depending on how the reference signal is defined, the determined time delay can be a time delay between an upstream receive signal and a downstream receive signal (e.g., the reference signal is the downstream receive signal) or a time delay between an upstream/downstream signal and a zero-flow receive signal. The speed/velocity of fluid flow within the fluid flow tube can be proportional to (or a function of) the time delay between the received digital signal and the reference signal. The processor can determine the fluid flow speed/velocity using the determined time delay (e.g., according to a lookup table or using mathematical operations).

The lookup table or mathematical operation used can depend on the temperature of the fluid within the fluid flow tube. The processor can obtain a measurement of a the fluid pressure measured, for example, by the thermocouple, and determine which lookup table or which mathematical operation to use in determining the time delay based on the fluid temperature measurement. The processor can compute the fluid flow rate using the determined time delay or the determined fluid speed/velocity. The processor can compute fluid usage based using multiple determined fluid flow rate values.

The processor can execute an algorithm to detect fluid leak events. For example, the processor can obtain indication(s) of one or more measurements recorded by an inline leak detector arranged within the fluid flow tube, and compare the measurements to fluid flow rate (or fluid flow speed) values determined by the processor based on receive signals associated with the ultrasonic sensors/transducers. The processor can determine existence or absence of a leak event based on the comparison. The inline leak detector can accurately measure relatively small fluid flow rate (or speed) values (such as flow rates smaller than 0.3, 0.4 or 0.5 GPM). The comparison can allow the processor to distinguish between measurement errors associated with signals recorded by the ultrasonic sensors/transducers from relatively small fluid flows due to leak events. The processor may execute other algorithms for detecting leak events.

Upon detecting a fluid leak event, the processor can transmit a signal to a controller of the motor or directly to the motor to trigger the motor to rotate the shut-off valve to a closed state and block fluid flow through the fluid flow tube. The processor can also monitor the current state of the shut-off valve. The control circuit board(s) 610 can also a memory for storing measurement values associated with various sensors, executable instructions, or other data for use by the processor or other components plumbing device 600. The plumbing device 600 can also include a radio transmitter (or a radio transceiver) for communicating with remote devices such as a Wi-Fi modem, a computer device, or other communication device. For instance, the processor can cause the radio transmitter to transmit measurement data obtained through the various sensors to a remote server, a mobile phone, or other device via a communication network.

The housing 612 can include a first enclosure (or top enclosure) 612*a* and a second enclosure (or bottom enclosure) 612*b*. The first and second enclosures 612*a* and 612*b* can mechanically engage one another to form the housing 612 around the combined fluid flow tube assembly 602, the sensor interface circuit board 604, the dive board 606, the motor assembly 608, and the control circuit board(s) 610.

Figure 7A:
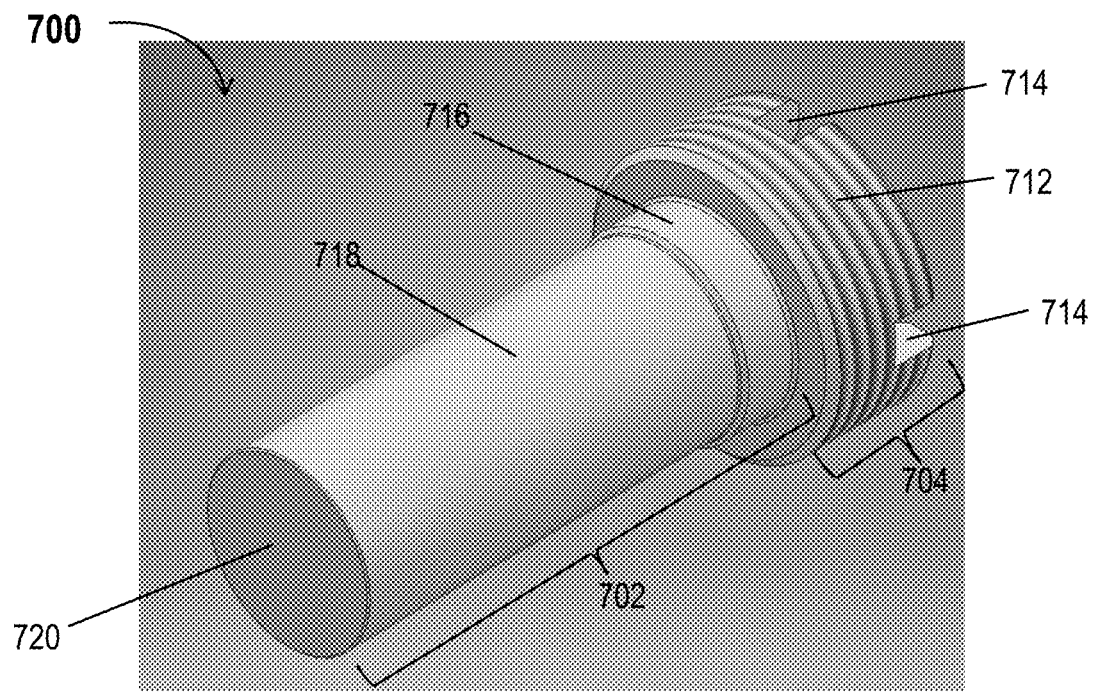
FIGS. 7A-7C show various views of a sensor mount, according to example embodiments of the current disclosure.
Figure 7B:
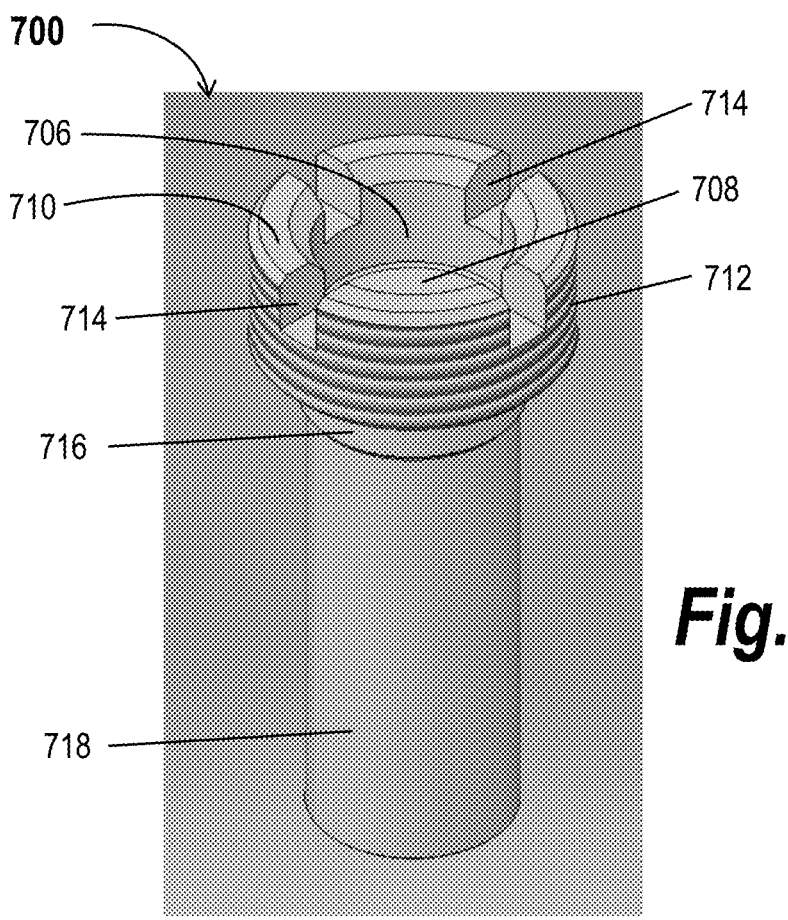
Figure 7C:
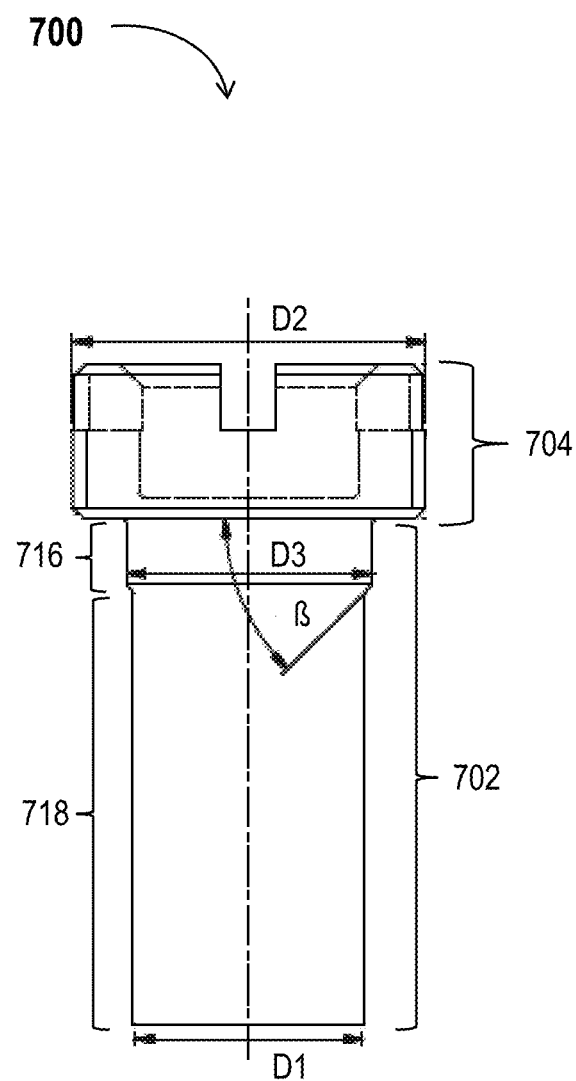

FIGS. 7A-7C show various views of a sensor mount 700, according to example embodiments of the current disclosure. The monolithic sensor mount 700 can include a first cylindrical portion 702 and a second cylindrical portion 704. The first cylindrical portion can have a first diameter D1 larger than a second diameter D2 of the second cylindrical portion. The second cylindrical portion 704 can define a recess region 706 to host an ultrasonic transducer (not shown in FIGS. 7A-7C). The sensor mount 700 can be arranged within a cavity (such as cavity 106, 110, 310, 314, 420, of 526 of FIGS. 1-5) of fluid flow tube 100, 302, 402, or 502.

The recess region 706 can include (or can be defined by) a mounting surface 708 for seating the ultrasonic sensor/transducer and a wall 710 surrounding the mounting surface 708. A person can place the ultrasonic sensor/transducer within the recess region 706. The ultrasonic sensor/transducer can be sealed using an adhesive. In some implementations, the recess region can include one or more protrusions for locking the ultrasonic transducer within the recess region 706. A person can push the ultrasonic transducer into the recess region 706. Once the ultrasonic transducer is passed the one or more protrusions, the protrusion(s) can lock the ultrasonic sensor/transducer into the recess region 706.

The sensor/ultrasonic mount 700 can be positioned (or locked) in the corresponding fluid flow tube cavity (or the corresponding tubular structure) of the fluid flow tube through a coupling mechanism. For instance, the outer surface of the second cylindrical portion can define (or include) a male thread 712 to mechanically engage a female thread of fluid flow tube cavity. The wall (or wall structure) 710 can include a plurality of groves 714 to mechanically receive or engage a screw driver (not shown in FIGS. 7A-7C). The depth of the grooves 714 can be smaller than a difference between a depth of the recess region 706 and a thickness of the ultrasonic transducer. In other words, when the ultrasonic sensor/transducer is placed within the recess region 706, the upper surface of the ultrasonic sensor/transducer can be at an offset distance below the bottom of the grooves 714. Accordingly, when a screw driver is placed in a some of the grooves 714, the screw driver does not reach or touch the ultrasonic sensor/transducer arranged within the recess region 706.

In some implementations, the recess region 706 can have a hexagonal shape sized to match an Allen key. Specifically, at least an upper portion of the recess region 706 can have a hexagonal inner shape configured to receive an Allen key (also referred to as hex key). The Allen key can engage the hexagonal portion of the recess region 706 to rotate the sensor mount 700 until the male thread 712 fully, or at least substantially (e.g., through more than half of the thread), engages the female thread of the fluid flow tube cavity. A bottom portion of the recess region 706 can have a cylindrical or other shape that matches a shape of the ultrasonic sensor/transducer.

The diameter D1 of the first cylindrical portion 702 can be smaller than a diameter of the fluid flow tube cavity (such as cavity 106, 110, 310, 314, 420, of 526 of FIGS. 1-5) hosting the sensor mount 700. Specifically, when the sensor mount 700 is arranged within the fluid flow tube cavity, a clearance or a space can exist between an outer surface of the first cylindrical portion 702 and an inner surface of the fluid flow tube cavity. The clearance or space between the outer surface of the first cylindrical portion 702 and the inner surface of the fluid flow tube cavity prevents cross talk between the sensor mount 700 and the tubular structure of the fluid flow tube hosting the sensor mount 700. Specifically, the clearance or space can prevent the ultrasonic signal from propagating from the sensor mount 700 to the tubular structure of the fluid flow tube hosting the sensor mount 700, and therefore prevent multipath propagation of the ultrasonic signals. Accordingly, the ultrasonic signals can propagate from the ultrasonic sensor/transducer along the longitudinal axis of the sensor mount 700 into the fluid flow tube towards the opposite sensor mount.

The first cylindrical portion 702 can include a first sub-portion 716 and a second sub-portion 718. The second sub-portion 718 can have a diameter D1 and the first sub-portion 716 can have a diameter D3 larger than D1. The first sub-portion 716 can be arranged between the second sub-portion 716 and the second cylindrical portion 704. In some implementations, both D1 and D3 can be smaller than the diameter of the fluid low tube cavity hosting the sensor mount 700, such that both the first and second sub-portions can be separated by a clearance or a space from the inner surface of the fluid low tube cavity hosting the sensor mount 700.

The length of the sensor mount 700 (or of the first cylindrical portion 702) can be larger than or equal to a depth of the fluid flow tube cavity hosting the sensor mount 700. Referring back to FIG. 2C, for example, the length of the sensor mounts 204a and 204b can be greater than or equal to the depth of the cavities 106 and 110 (or the tubular structures 108 and 112). The depth of the cavities 106 and 110 can vary along the intersection between each of the tubular structures 108 and 112 and the tubular structure 102. A portion of each of the sensor mounts 204a and 204b (each of the portions indicated by the dashed ellipses) can be arranged within the lumen 104 such that the sensor mounts 204a and 204b are partially interfering with fluid flow within the lumen 104. Referring back to FIGS. 7A-7C, the first cylindrical portion 702 of the sensor mount 700 can have an end-face surface can be a flat circular area. The end-face surface 720 of the first cylindrical portion 702 of the sensor mount 700 can be a flat surface. In some implementations, the end-face surface 720 can be a concave surface (or can have a concave structure), for example, such that the concave surface matches (or is aligned with) the inner surface of the tubular structure forming the lumen of the fluid flow tube. Whether the sensor mount 700 is partially intruding into the lumen or the end-face surface 720 is concave and aligned with the inner surface of the tubular structure forming the lumen, the fact that no recess is formed when the sensor mount 700 is arranged within the fluid flow tube cavity prevents residuum from accumulating against the end-face surface 720. Such accumulation would be difficult to account for when determining fluid flow rate, especially that sound speed in the residuum can be different than that in sensor mount 700.

The monolithic sensor mount 700 can be made of plastic. For instance, the monolithic sensor mount 700 can be made of made of polyvinylchloride (PVC) or polysulfone (PSU). Using plastic to manufacture the sensor mount 700 can improve the performance of the sensor mount 700. Specifically, when fluid temperature increases, the speed of sound in the fluid also increases whereas the speed of sound within the plastic sensor mount decreases, therefore, compensating for the change of speed of sound in the fluid.

It should be understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

While the invention has been particularly shown and described with reference to specific embodiments, it should be understood by those skilled in the art that various changes in form and detail may be made therein without departing from the spirit and scope of the invention as defined by the following claims. For example, the manifolds disclosed herein may be used to monitor flow rates of fluids other than water, such as oil, gasoline, etc.

What is claimed is:

1. A fluid flow tube comprising:
a single integral tube body having a longitudinal axis;
the single integral tube body defining a first cavity for receiving a first ultrasonic sensor and having a first longitudinal axis intersecting a longitudinal axis of the single integral tube body;
the single integral tube body defining a second cavity for receiving a second ultrasonic sensor and having a second longitudinal axis aligned with the first longitudinal axis such that the first longitudinal axis and the second longitudinal axis are the same and intersect the longitudinal axis of the single integral tube body at an angle between zero and ninety degrees, wherein the longitudinal axis, the first longitudinal axis, and the second longitudinal axis define a plane; and
the single integral tube body including:
a first tubular portion a) having a first transverse inner cross sectional area that extends to a first end of the single integral tube body and b) including at least one borehole (a) for hosting at least one sensor or electric couplings to the at least one sensor and (b) having a third longitudinal axis that does not lie on the plane, and
a second tubular portion defining a third cavity i) having a second transverse inner cross sectional area (i) larger than the first transverse inner cross sectional area of the first tubular portion, and (ii) extending, wherein the second transverse inner cross sectional area extends to a second end of the single integral tube body, and ii) adapted the third cavity is sized to receive a shut-off valve.

2. The fluid flow tube of claim 1 made of at least one of:
brass;
copper;
stainless steel;
plastic; or
engineered composite material.

3. The fluid flow tube of claim 1, wherein the third cavity is defined by a hollow structure to enclose the shut-off valve, the hollow structure including an opening to receive a stem of the shut-off valve.

4. The fluid flow tube of claim 3, wherein the hollow structure includes one or more grooves for engaging one or more elements of a housing of the fluid flow tube or receiving mechanical coupling components to mechanically couple the fluid flow tube to the housing.

5. The fluid flow tube of claim 3, wherein the hollow structure has at least one of:
a cylindrical shape; and
a spherical shape.

6. The fluid flow tube of claim 1, wherein the first tubular portion defines a lumen that is connected to the first cavity, the second cavity, and the third cavity, the lumen associated with the first transverse inner cross sectional area.

7. The fluid flow tube of claim 6, wherein the first cavity is defined by a third tubular portion extending beyond an outer surface of the first tubular portion, and the second cavity is defined by a fourth tubular portion extending beyond the outer surface of the first tubular portion.

8. The fluid flow tube of claim 1, wherein the at least one sensor includes a pressure sensor or a thermocouple.

9. The fluid flow tube of claim 1 including at least one thread at the first end or the second end to engage a pipe or a fitting.

10. A plumbing device comprising:
a fluid flow tube comprising:
a single integral tube body having a longitudinal axis;
the single integral tube body defining a first cavity having a first longitudinal axis for receiving a first ultrasonic sensor, the first longitudinal axis intersecting a longitudinal axis of the single integral tube body;
the single integral tube body defining a second cavity for receiving a second ultrasonic sensor, the second cavity having a second longitudinal axis aligned with the first longitudinal axis, such that the first longitudinal axis and the second longitudinal axis are the same and intersect the longitudinal axis of the single integral tube body at an angle between zero and ninety degrees, wherein the longitudinal axis, the first longitudinal axis, and the second longitudinal axis define a plane;
the single integral tube body including:
a first tubular portion a) having a first transverse inner cross sectional area that extends to a first end of the single integral tube body and b) including at least one borehole (a) for hosting at least one sensor or electric couplings to the at least one sensor and (b) having a third longitudinal axis that does not lie on the plane, and
a second tubular portion defining a third cavity j) having a second transverse inner cross sectional area (i) larger than the first transverse inner cross sectional area of the first tubular portion, and (ii) extending to a second end of the single integral tube body, and ii) adapted to receive a shut-off valve of a shut-off valve assembly; and
a groove disposed in the second tubular portion of the single integral tube body that mechanically couples to at least a part of the shut-off valve assembly; and
a fitting engaging the single integral tube body at the second end of the single integral tube body.

11. The plumbing device of claim 10 further comprising:
the shut-off valve enclosed within a hollow structure defining the third cavity;
a motor of the shut-off valve assembly to impart motion to the shut-off valve; and
a stem of the shut-off valve assembly mechanically coupling the shut-off valve to the motor, the stem passing through a borehole of the hollow structure.

12. The plumbing device of claim 11 further comprising a control circuit board for actuating the motor.

13. The plumbing device of claim 10 further comprising a first sensor mount arranged within the first cavity and a second sensor mount arranged within the second cavity, the first sensor mount including a first recess hosting the first ultrasonic sensor and the second sensor mount including a second recess hosting the second ultrasonic sensor.

14. The plumbing device of claim 13 further comprising a control circuit board to exchange signals with the first and second ultrasonic sensors.

15. The plumbing device of claim 10 further comprising a housing enclosing the fluid flow tube.

16. The plumbing device of claim 10 further comprising: a sensor of the at least one sensor arranged within one of the at least one borehole one; and a sensor interface board electrically coupled to one or more processors, wherein: the first tubular portion defines a tubular structure defining a lumen of the fluid flow tube.

17. The plumbing device of claim 16, wherein the sensor comprises a pressure sensor or a thermocouple.

18. The plumbing device of claim 10, wherein the fitting includes a push-to-connect fitting or a threaded fitting to engage the fluid flow tube.

* * * * *

UNITED STATES PATENT AND TRADEMARK OFFICE
CERTIFICATE OF CORRECTION

PATENT NO. : 11,293,562 B2
APPLICATION NO. : 15/942068
DATED : April 5, 2022
INVENTOR(S) : Frank McCarthy Mess et al.

It is certified that error appears in the above-identified patent and that said Letters Patent is hereby corrected as shown below:

In the Claims

Column 21, Line 34, Claim 10, delete "j)" and insert -- i) --.

Signed and Sealed this
Twenty-seventh Day of December, 2022

*Katherine Kelly Vidal*

Katherine Kelly Vidal
*Director of the United States Patent and Trademark Office*